(12) United States Patent
Gemba et al.

(10) Patent No.: US 11,887,290 B2
(45) Date of Patent: Jan. 30, 2024

(54) ELECTRONIC COMPONENT EVALUATION METHOD, ELECTRONIC COMPONENT EVALUATION DEVICE, AND ELECTRONIC COMPONENT EVALUATION PROGRAM

(71) Applicant: SUMIDA CORPORATION, Tokyo (JP)

(72) Inventors: Daichi Gemba, Natori (JP); Junji Morita, Natori (JP)

(73) Assignee: SUMIDA CORPORATION

( * ) Notice: Subject to any disclaimer, the term of this patent is extended or adjusted under 35 U.S.C. 154(b) by 242 days.

(21) Appl. No.: 17/211,953

(22) Filed: Mar. 25, 2021

(65) Prior Publication Data

US 2021/0334951 A1 Oct. 28, 2021

(30) Foreign Application Priority Data

Apr. 23, 2020 (JP) ................. 2020-076717

(51) Int. Cl.
*G06T 7/00* (2017.01)
*G06T 7/62* (2017.01)
*G06T 7/70* (2017.01)

(52) U.S. Cl.
CPC .............. *G06T 7/0002* (2013.01); *G06T 7/62* (2017.01); *G06T 7/70* (2017.01)

(58) Field of Classification Search
CPC ........... G06T 7/0002; G06T 7/62; G06T 7/70; G01B 11/25; G01B 2210/56;

(Continued)

(56) References Cited

U.S. PATENT DOCUMENTS 5,347,363 A * 9/1994 Yamanaka ............. H04N 7/181
348/E7.086
2016/0209206 A1* 7/2016 Yu ......................... G01B 11/167
(Continued)

FOREIGN PATENT DOCUMENTS

JP H05-223533 A 8/1993
JP 2002-323308 A 11/2002
(Continued)

OTHER PUBLICATIONS

European Search Report issued for corresponding European Patent Application No. EP21168572; dated Sep. 3, 2021 (total 9 pages).
(Continued)

*Primary Examiner* — Chan S Park
*Assistant Examiner* — Daniel C Chang
(74) *Attorney, Agent, or Firm* — Harness, Dickey & Pierce, P.L.C.

(57) ABSTRACT

An electronic component evaluation method of evaluating a state of an electronic component includes acquiring reference point information, with respect to at least one terminal, reference point information including at least one of position information and first height information of a plurality of corresponding reference points on the terminal from imaging data obtained by image-capturing the electronic component including a component body and a plurality of terminals attached to the component body, and determining a state according to a shape of the electronic component based on a plurality of pieces of the reference point information.

20 Claims, 13 Drawing Sheets

(58) Field of Classification Search
CPC ..... G01B 11/0608; G01B 11/00; G01B 11/30; G01N 2021/95661
See application file for complete search history.

(56) References Cited

U.S. PATENT DOCUMENTS

2019/0239400 A1* 8/2019 Ishikawa ............ H05K 13/0409
2019/0346260 A1   11/2019 Morita et al.

FOREIGN PATENT DOCUMENTS

| JP | 2007-225317 A | | 9/2007 | |
|---|---|---|---|---|
| JP | 2007-327824 A | | 12/2007 | |
| JP | 2007327824 A | * | 12/2007 | |
| JP | 2019197018 A | * | 11/2019 | ............. G01B 11/03 |

OTHER PUBLICATIONS

Office Action issued in the corresonding Japanese Patent Application No. 2020-076717; dated Dec. 5, 2023 (total 6 pages).

* cited by examiner

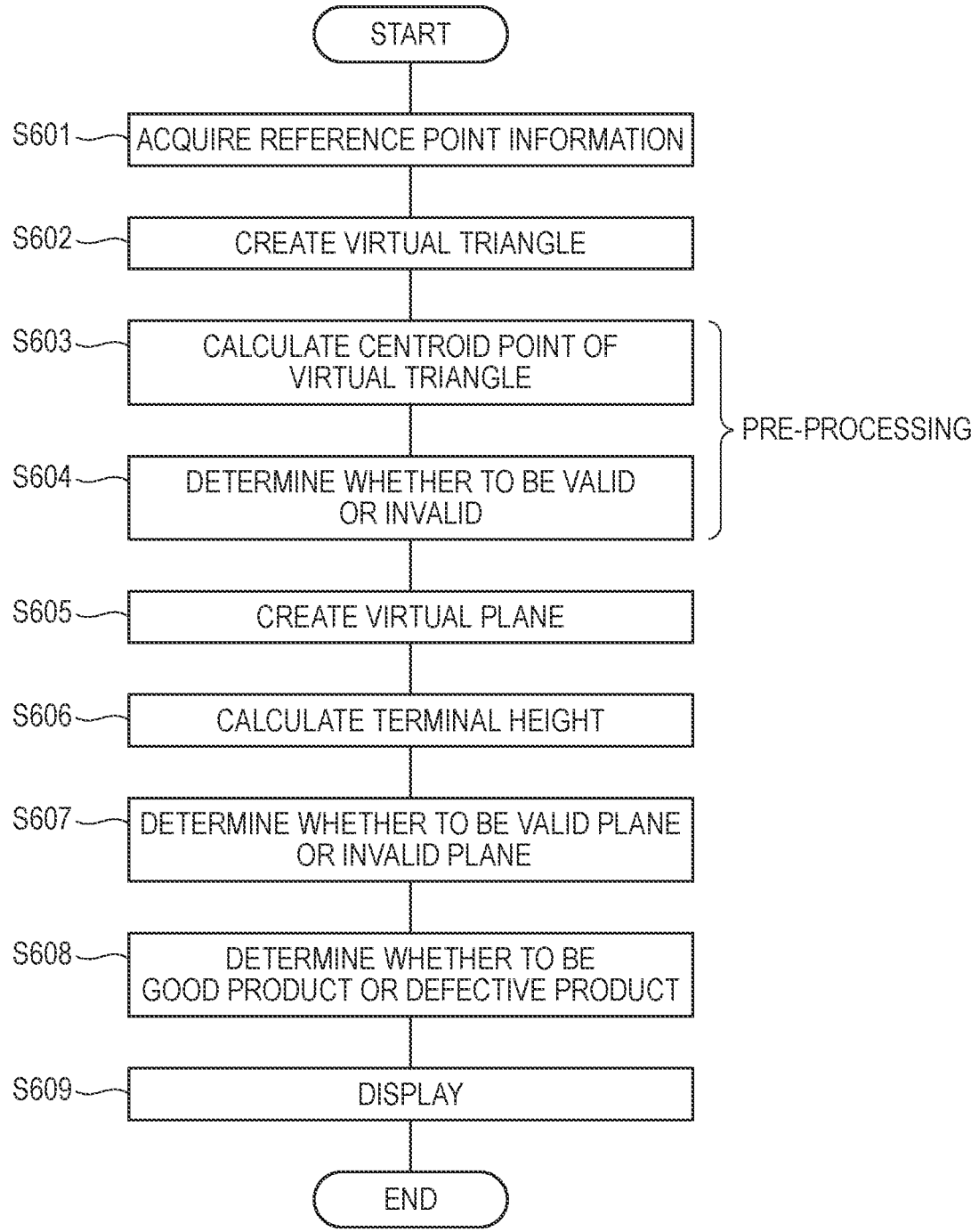

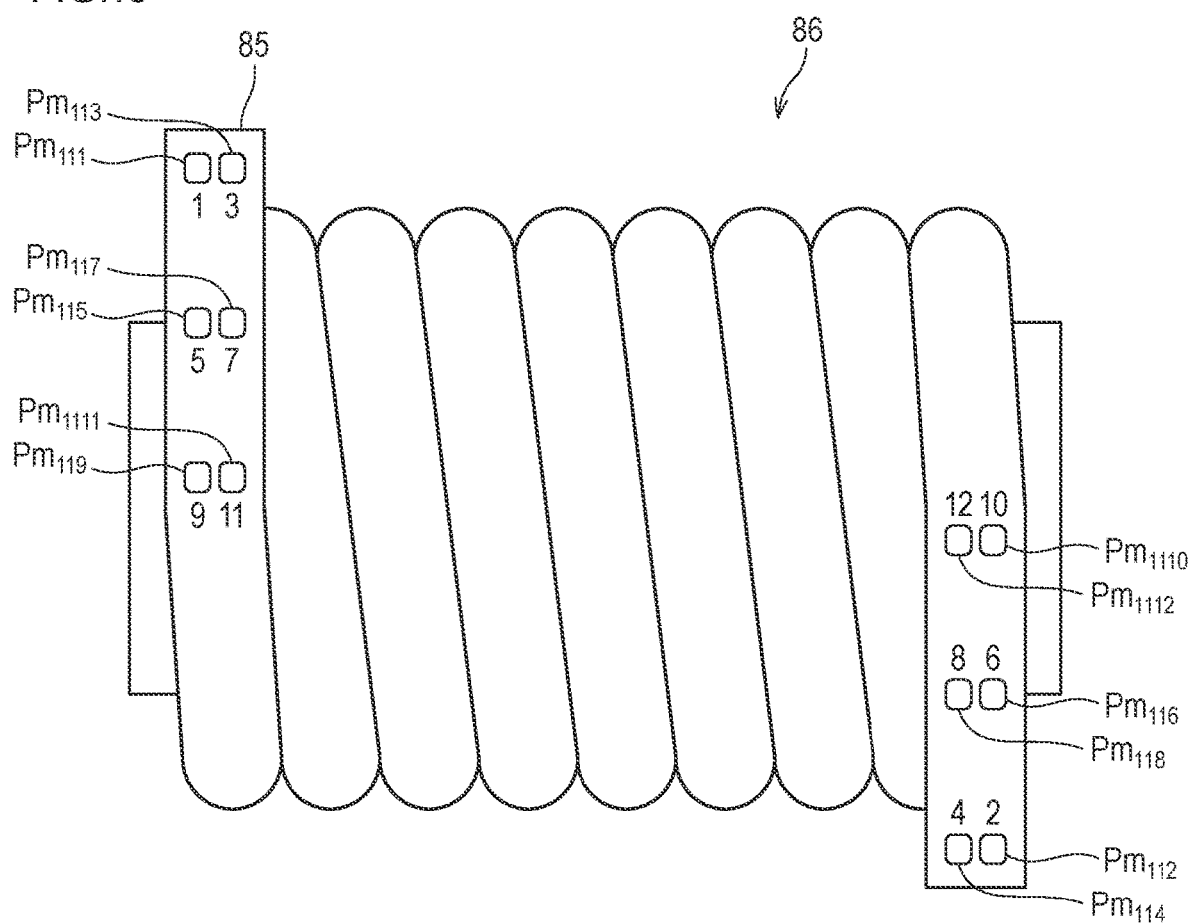

ELECTRONIC COMPONENT EVALUATION METHOD, ELECTRONIC COMPONENT EVALUATION DEVICE, AND ELECTRONIC COMPONENT EVALUATION PROGRAM

CROSS-REFERENCE TO RELATED APPLICATIONS

This application claims priority to Japanese Patent Application No. 2020-076717 filed Apr. 23, 2020, which is hereby expressly incorporated by reference herein in its entirety.

BACKGROUND

Field of the Invention

The present invention relates to an electronic component evaluation method, an electronic component evaluation device, and an electronic component evaluation program.

Related Art

In a manufacturing process of electronic components and the like, it is necessary to inspect whether a manufactured electronic component satisfies a required standard. An electronic component that does not satisfy the required standard is determined to be defective (NG) in a stage of inspection, because such an electronic component causes problems at the time of mounting performed later. In many cases, all the components are inspected at the time of inspection of electronic components, and inspection of each electronic component is required to be performed in a short time and with high accuracy. A known technique related to inspection of electronic components is disclosed in, for example, Japanese Laid-open patent publication No. 2007-225317 and Japanese Laid-open patent publication No. H05-223533.

Japanese Laid-open patent publication No. 2007-225317 discloses a device that radiates line light from below a component, captures a projected image of the line light by a camera, and obtains flatness of a terminal or height data of a ball from a light cutting line by the line light.

Additionally, Japanese Laid-open patent publication No. H05-223533 discloses a height measurement device in which, to measure a terminal height in a state where an electronic component is mounted, the electronic component is mounted on a glass substrate, and laser light is radiated on the electronic component from a side of the glass substrate. The height measurement device measures a terminal height by concentrating the reflected light reflected by a terminal of the electronic component, on a one-dimensional sensor.

According to the known techniques disclosed in Japanese Laid-open patent publication No. 2007-225317 and Japanese Laid-open patent publication No. H05-223533, a degree of turning to the left and right (flatness) around a horizontal axis of the electronic component when the electronic component is placed on a horizontal surface can be detected. The flatness is a parameter related to improper mounting. The reliability of mounting can be ensured by shipping the electronic component whose flatness is in a specified range, as a good product (OK).

However, the improper mounting of the electronic component is found after a circuit on which the electronic components are mounted is completed. When the improper mounting occurs, "NG" is determined for the entire circuit on which a plurality of electronic components are mounted. Therefore, the flatness is required to be determined with higher accuracy in the stage of inspection of the electronic components. Additionally, to prevent the improper mounting in the stage of inspection of the electronic components, it is effective to evaluate not only the flatness but also size, distortion and the like of a terminal. The evaluation criteria vary depending on the use of the electronic component and the terminal shape. Accordingly, to inspect the electronic component, it is desirable to evaluate the shape of the terminal itself.

The present invention has been made in view of the above circumstances, and relates to an electronic component evaluation method, an electronic component evaluation device, and an electronic component evaluation program that are capable of evaluating an electronic component by detecting flatness of an electronic component with higher accuracy and determining states of individual terminals.

SUMMARY

According to the present invention, there is provided an electronic component evaluation method of evaluating a state of an electronic component based on imaging data obtained by image-capturing the electronic component including a component body, and a plurality of terminals attached to the component body, the method comprising:

acquiring, with respect to at least one of the plurality of terminals, reference point information including at least one of position information and first height information of a plurality of reference points of the terminal; and determining a state according to a shape of the electronic component based on a plurality of pieces of the reference point information.

In addition, according to the present invention, there is provided an electronic component evaluation device that evaluates a state of an electronic component based on imaging data obtained by image-capturing the electronic component including a component body, and a plurality of terminals attached to the component body, the device comprising a reference point information acquisition unit that acquires, with respect to at least one of the plurality of terminals, reference point information including at least one of position information and first height information of a plurality of reference points of the terminal, and a state determination unit that determines a state according to a shape of the electronic component based on a plurality of pieces of the reference point information.

In addition, according to the present invention, there is an electronic component evaluation program to be executed by an electronic component evaluation device that evaluates a state of an electronic component based on imaging data obtained by image-capturing the electronic component including a component body, and a plurality of terminals attached to the component body, the program causing a computer to execute a reference point information acquisition function of acquiring, with respect to at least one of the plurality of terminals, reference point information including at least one of position information and first height information of a plurality of reference points of the terminal, and a state determination function of determining a state according to a shape of the electronic component based on a plurality of pieces of the reference point information.

There can be provided an electronic component evaluation method, an electronic component evaluation device, and an electronic component evaluation program that are capable of evaluating an electronic component by detecting flatness of an electronic component with higher accuracy and determining states of individual terminals.

BRIEF DESCRIPTION OF THE DRAWINGS

The above and other objects, advantages and features of the present invention will be more apparent from the following description of certain preferred embodiments taken in conjunction with the accompanying drawings, in which:

FIG. 8 is a flowchart for illustrating an electronic component evaluation method of a second embodiment;

FIG. 13 is a diagram for illustrating an example in which the electronic component evaluation method of the first embodiment or the second embodiment is applied to an air core coil.

DETAILED DESCRIPTION

Figure 1A:
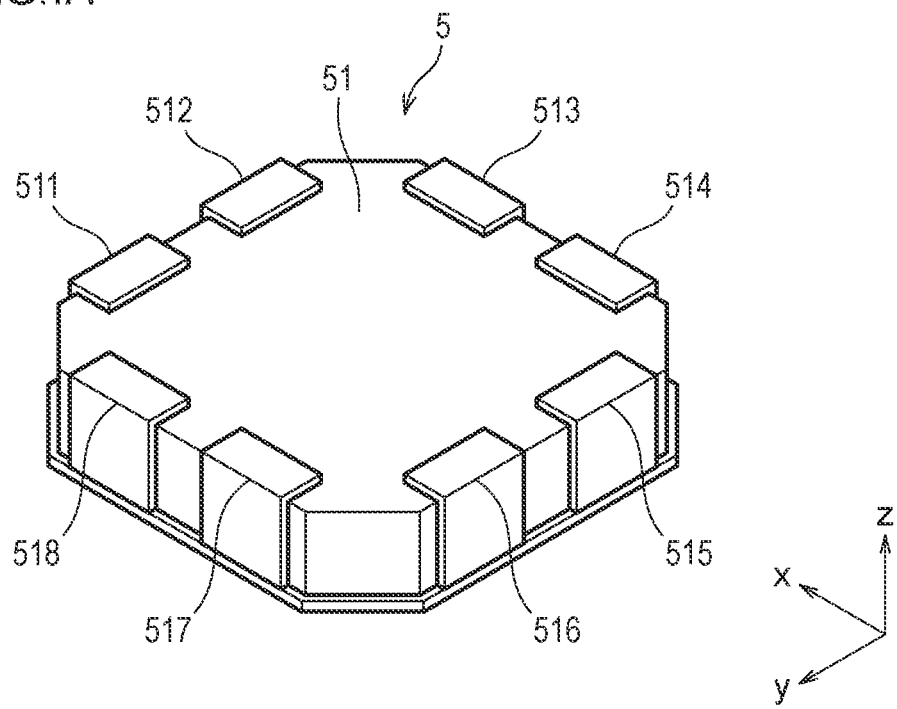
FIG. 1A is a perspective view illustrating an electronic component to be evaluated by an electronic component evaluation method and the like of a first embodiment.

The invention will be now described herein with reference to illustrative embodiments. Those skilled in the art will recognize that many alternative embodiments can be accomplished using the teachings of the present invention and that the invention is not limited to the embodiments illustrated for explanatory purposed.

Overview

First, before describing embodiments of the present invention, an overview thereof will be described. An electronic component evaluation method of the embodiment is applied to evaluating a state of an electronic component based on imaging data obtained by image-capturing the electronic component including a component body and a plurality of terminals attached to the component body.

The above-described electronic component includes the component body and the terminals. The component body is a resin package in which the electronic components including a coil component and a semiconductor device are encapsulated. The terminal is a metal member that is electrically and mechanically connected to components in the package. In the electronic component evaluation method of the present invention and the like, the electronic component is to be evaluated, before the electronic component is mounted on a mounting substrate.

The imaging data of the electronic component includes at least one of two-dimensional data obtained by image-capturing the appearance of the electronic component in one direction and height data obtained by image-capturing the electronic component in a top view in the height direction. A height measured by image-capturing is referred to as a "first height" in the embodiment. The reference point information is at least one of position information obtained from the two-dimensional data obtained by image-capturing points on the terminal and the first height information.

In the embodiment, a plurality of reference points are set on each of a plurality of terminals. For example, in a case where four reference points are set on one terminal with respect to the electronic component having eight terminals, 32 reference points in total are provided in one electronic component.

Determining a state according to a shape of the terminal based on a plurality of pieces of reference point information refers to, for example, determining an individual terminal shape and a state of the plurality of terminals (terminal group) by using a plurality of pieces of the reference point information of one terminal or the pieces of information of the 32 reference points.

Hereinafter, an electronic component evaluation method, an electronic component evaluation device, and an electronic component evaluation program of a first embodiment and a second embodiment of the present invention will be described with reference to the drawings. In all the drawings, same components are denoted by a same reference sign, and a redundant description will not be repeated as appropriate. The drawings for the embodiment are schematic drawings each for describing a configuration, a mechanism, or operation of the present invention, and do not necessarily accurately show a dimensional shape, a length-to-width ratio, and the like.

The state according to the shape of the electronic component refers to a state of a part or the entirety of the electronic component that is determined according to the component body, the terminals, and the shape and positional relationship therebetween. Such a state may be an inclination angle or direction of the electronic component after being mounted or may be the presence or absence of floating from a mounting surface of the terminal or the degree of floating.

First Embodiment

Figure 1B:
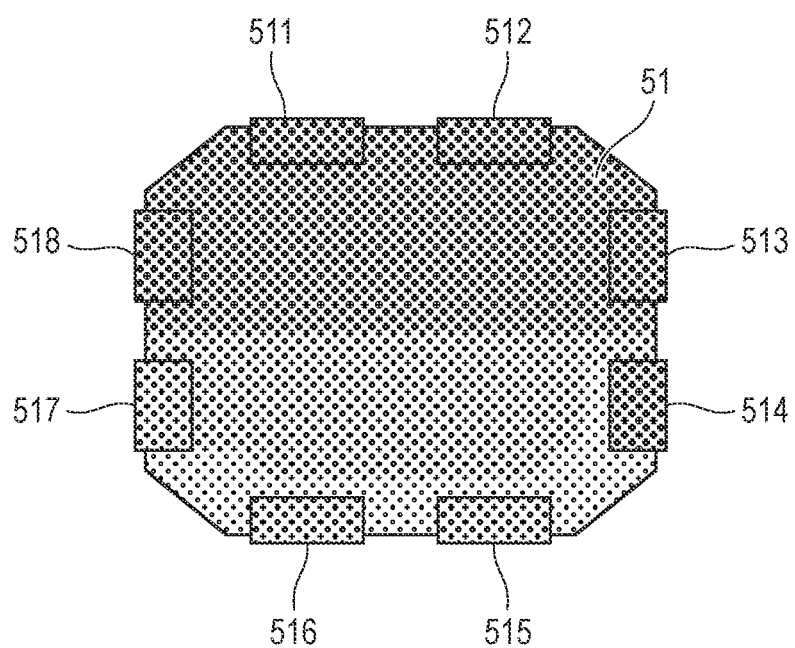
FIG. 1B is a diagram illustrating the electronic component shown in FIG. 1A image-captured from above.

FIG. 1A is a perspective view illustrating an electronic component 5 to be evaluated by an electronic component evaluation method and the like of a first embodiment. FIG. 1B is a diagram illustrating the electronic component 5 shown in FIG. 1A image-captured from above. In the embodiment, a z direction of x, y, z coordinate axes shown in FIG. 1A is defined as "up," and a −z direction (not shown in the drawing) that is opposite to the z direction along the z-axis is defined as "down." However, such an up-down direction is opposite to an up-down direction at a time of use of the electronic component 5 mounted on a substrate. That is, in the embodiment, a side of a mounting surface provided on a bottom surface side of the electronic component 5 is defined as an upper side.

As shown in FIG. 1A, the electronic component 5 includes a component body 51, and a plurality (eight) of terminals 511 to 518. The terminals 511 to 518 of the electronic component 5 are of a type referred to as small outline J-leaded (SOJ) in which each terminal is formed by bending a lead into a J-shape toward a side (inside) of the component body 51. With respect to each of the terminals 511 to 518, four points at predetermined positions among points on a surface (upper surface) facing the z direction are referred to as reference points Pm, for example.

The terminals 511 to 518 are formed by pressing an alloy of iron and nickel as a material, for example. However, the first embodiment is not limited to being applied to an electronic component including SOJ terminals, and is mainly preferable for evaluating a terminal of a surface mount type electronic component. Examples of another terminal include a lead frame that is soldered to and mounted on a mounting substrate. A terminal is plated with gold, nickel alloy, solder or the like as appropriate according to use or accuracy. Alternatively, the lead frame may be formed by punching phosphor bronze by a press and plating it with tin.

The component body 51 of the electronic component 5 is an electronic component in which a coil component, a semiconductor device, and the like (not shown in the drawing) are collectively sealed. As a sealing material, a thermally curable liquid resin material is used, for example. As a resin material, an epoxy resin is used, for example. As a filler, a silica filler is used, for example. However, the sealing material is not limited to such a material, and an appropriate material is selected from the standpoint of high adhesiveness to the components or a terminal material, low ionic impurity, low stress properties, high heat resistance, ease of shaping, and the like.

An image shown in FIG. 1B is an image that is captured by a camera, indicated in FIG. 4 or 5, that is capable of capturing a three-dimensional image (hereinafter, referred to as a "3D camera"). The 3D camera measures a shortest distance (distance h) from an imaging sensor to an upper surface of the component body 51, for example. The image is represented by different colors according to a first height which is the measured height. In FIG. 1B, different colors are represented by halftones at different density levels. The image is provided to a worker who evaluates the electronic component via a display screen of an electronic component evaluation device, for example. The worker may intuitively grasp approximate first height of each reference point of the electronic component 5 by looking at the image.

Figure 2A:
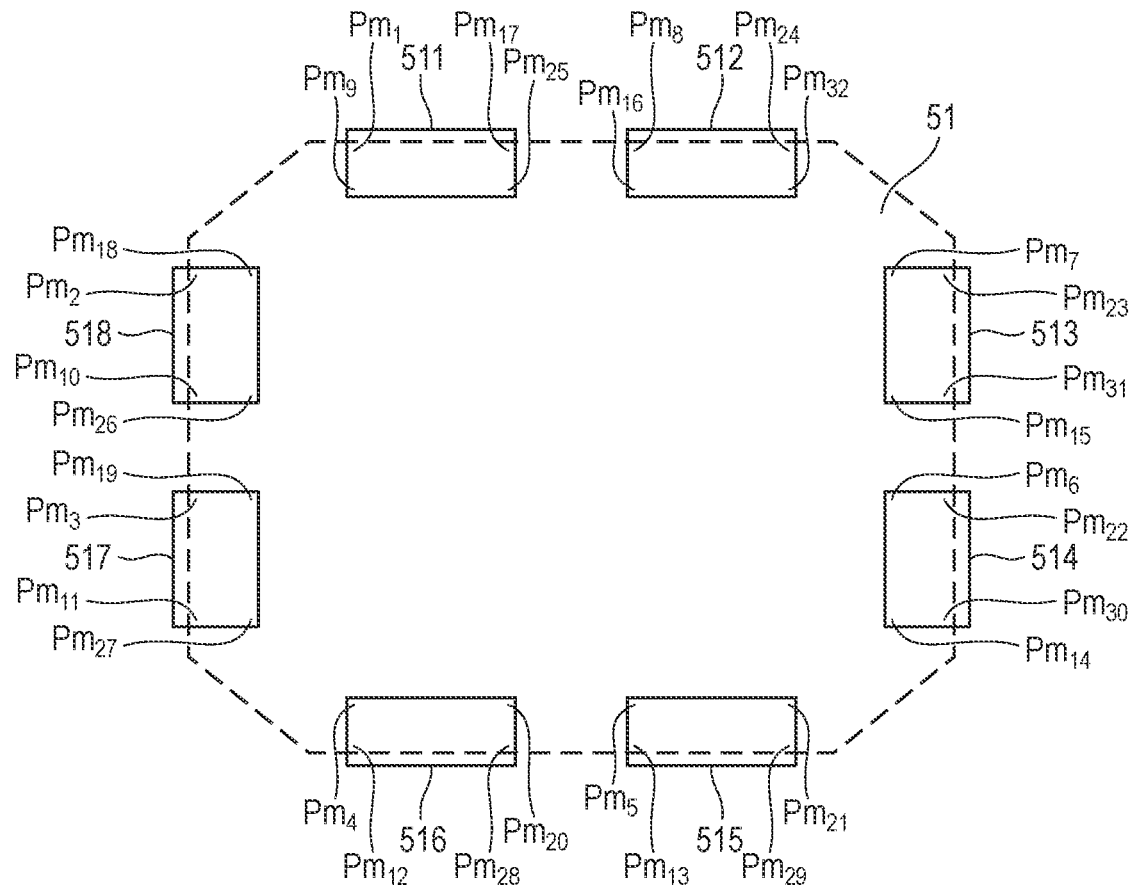
FIG. 2A is a diagram for illustrating a plurality of reference points set on an electronic component shown in FIG. 1A.
Figure 2B:
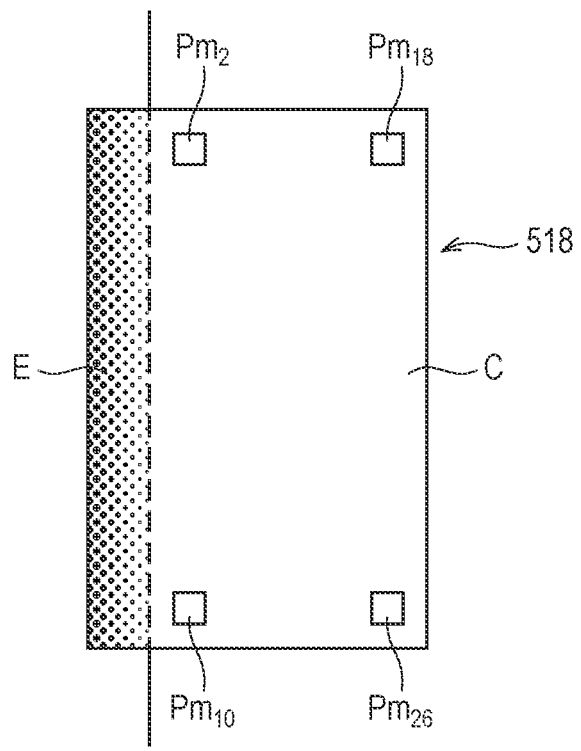
FIG. 2B is an enlarged view showing one terminal shown in FIG. 2A.

FIGS. 2A and 2B each are a diagram for illustrating a plurality of reference points set on the electronic component 5. FIG. 2A is a diagram showing the entirety of the electronic component 5. FIG. 2B is an enlarged view showing the terminal 518 in FIG. 2A. In FIG. 2A, the component body 51 is indicated by a broken line to clearly show each reference point of the terminals 511 to 518. In the first embodiment, four reference points are defined on each of the terminals 511 to 518, and the 32 reference points Pm1 to Pm32 in total are set on the electronic component 5. When viewing each terminal from above, the reference points each are located slightly closer to a center portion of the terminal than corresponding one of the intersection points (hereinafter, referred to as "edge portions") of four sides. This is because the edge portions tend to be blurred in the imaging data and are less suitable for being positioned. Distances between each of the reference points Pm1 to Pm32 and the corresponding edge portion are preferably approximately 3 to 10 pixels of a two-dimensional image captured by the 3D camera.

In the first embodiment, as shown in FIG. 2B, the terminal includes a bent portion E that is bent along the component body, and a plane portion C that is along the mounting surface of the electronic component 5. Here, the mounting surface is a surface facing the substrate when the electronic component 5 is to be mounted on the substrate. The electronic component evaluation method of the first embodiment further includes, prior to acquiring the reference point information, preliminarily capturing a three-dimensional image of the entire surface of the electronic component 5 (FIG. 1B), and generating the entire image identifying at least a difference in height between the bent portion E and the plane portion. In the preliminarily capturing and generating, the reference points Pm2, Pm10, Pm18, and Pm26 are selected from the inner side of the plane portion C with respect to a boundary between the bent portion E and the plane portion C.

Here, the identification indicates that the captured image is represented by different colors according to the measured first height, as illustrated in FIG. 1B. In the first embodiment, for example, by image processing, the plane portion C which is other than the bent portion E in the terminal 518 is determined, so that the reference points Pm2, Pm10, Pm18, Pm26 are set within a range of the plane portion C. This image processing can prevent the reference points from being set on blurred portions in the image that are caused by scattering of reflected light of light radiated on a curved surface of the bent portion.

Note that the above-described plane portion C refers to not a surface without unevenness or inclination, but a surface that is not a curved surface such as the bent portion E.

Additionally, the above-described image processing may be, for example, a process of selecting a range in which a color appears, the color being determined as indicating the plane portion C which is higher in height than the bent portion E, or a process of selecting a range in which an area of a predetermined color is larger than a predetermined area. However, in the first embodiment, the plane portion C may be selected not only by the image processing but also by manual operation of the worker.

As shown in FIG. 2A, the four reference points Pm1, Pm9, Pm17, and Pm25 are set on the terminal 511. Similarly, the reference points Pm2, Pm10, Pm18, and Pm26 are set on the terminal 518, the reference points Pm3, Pm11, Pm19, and Pm27 are set on the terminal 517, the reference points Pm4, Pm12, Pm20, and Pm28 are set on the terminal 516, the reference points Pm5, Pm13, Pm21, and Pm29 are set on the terminal 515, the reference points Pm6, Pm14, Pm22, and Pm30 are set on the terminal 514, the reference points Pm7, Pm15, Pm23, and Pm31 are set on the terminal 513, and the reference points Pm8, Pm16, Pm24, and Pm32 are set on the terminal 512. The numbers following "Pm" indicate the order of measurement of the plurality of reference points. As shown in FIG. 2A, in the first embodiment, the reference points on the different terminals are adapted to be successively measured. Hereinafter, individually and successively measuring the reference points from the terminal 511 to the terminal 518 is referred to as "one cycle."

However, in this specification, in a case where it is unnecessary to distinguish among the reference points, the reference points are simply referred to as "reference points Pm."

(Electronic Component Evaluation Device, Electronic Component Evaluation Method)

Figure 3:
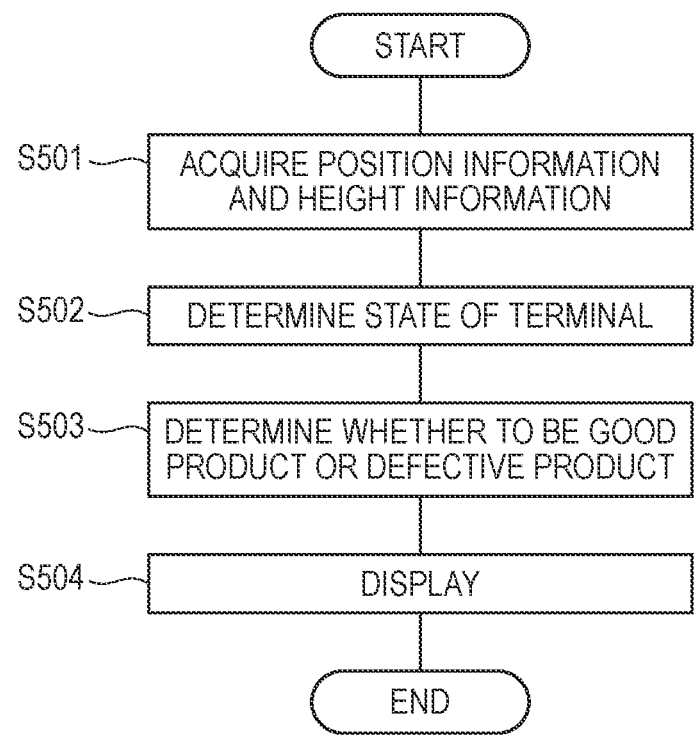
FIG. 3 is a flowchart for illustrating an electronic component evaluation method of the first embodiment.

FIG. 3 is a flowchart for illustrating an electronic component evaluation method of the first embodiment. The processes shown in FIG. 3 are performed by the electronic component evaluation program to be executed in the first embodiment. The electronic component evaluation program causes a computer to execute a reference point information acquisition function of acquiring, with respect to at least one of the plurality of terminals, reference point information including at least one of position information and first height information of the plurality of reference points of the terminal, and a state determination function of determining a state according to a shape of the terminal based on a plurality of pieces of the reference point information. The reference point information acquisition function and the state determination function are programs running on hardware of the electronic component evaluation device including the computer.

An electronic component evaluation method shown in FIG. 3 includes acquiring, with respect to at least one of the terminals 511 to 518, the reference point information of the plurality of corresponding reference points Pm1 to Pm32 on the corresponding terminals 511 to 518 (step S501), and determining a state according to a shape of the terminal based on a plurality of pieces of the reference point information (step S502).

Additionally, in the first embodiment, it is determined whether the electronic component 5 is a good product or a defective product by comparing the determined result in step S502 with a preset specification condition (step S503). Furthermore, in the first embodiment, a result of the determination of a good product or a defective product is output and displayed to the worker (step S504).

The above-described processes will be specifically described together with a configuration of the electronic component evaluation device that performs the processes.

Figure 4:
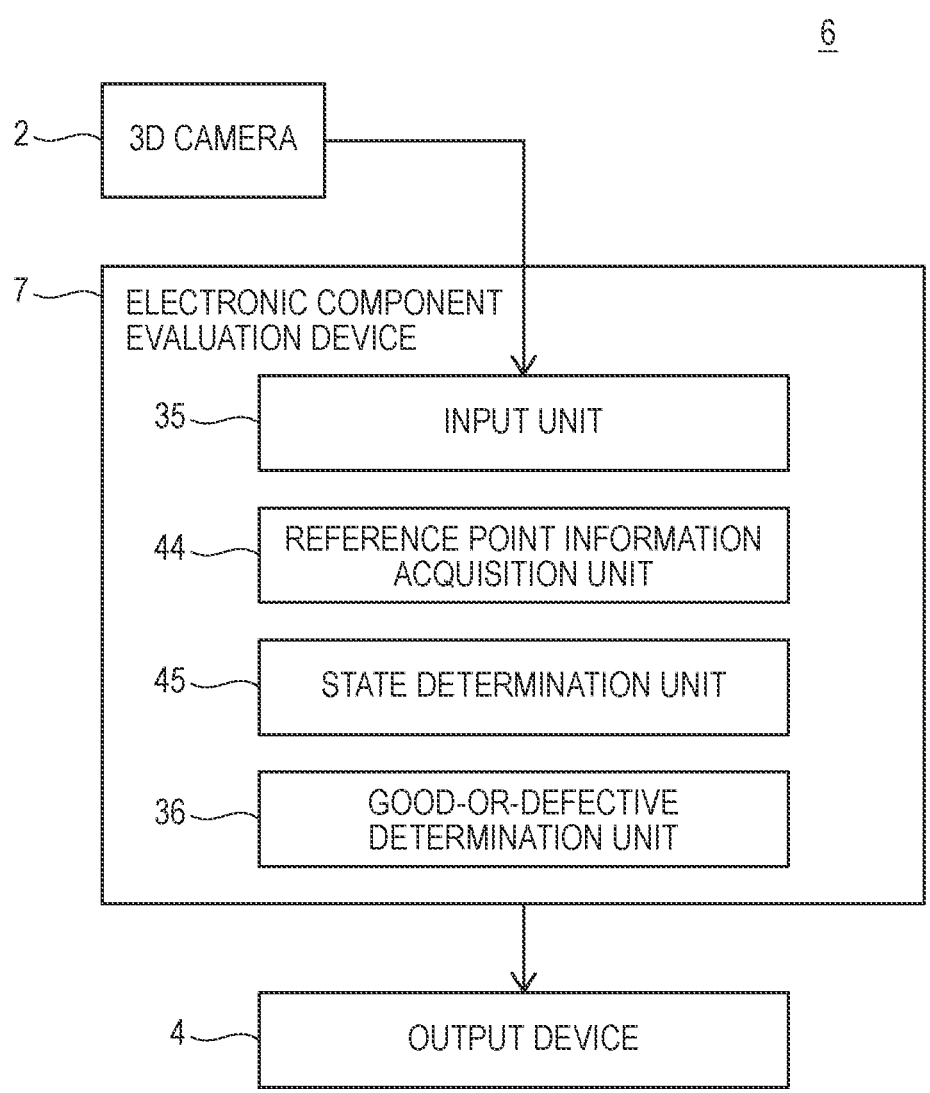
FIG. 4 is a block diagram for illustrating an electronic component evaluation system including an electronic component evaluation device of the first embodiment.

FIG. 4 is a block diagram for illustrating an electronic component evaluation system 6 including an electronic component evaluation device 7 of the first embodiment, and shows mechanical components including a 3D camera 2 in the electronic component evaluation system 6. As shown in FIG. 4, the electronic component evaluation system 6 includes the 3D camera 2, an output device 4, and the electronic component evaluation device 7. The electronic component evaluation device 7 evaluates the state of the electronic component 5 based on the imaging data obtained by image-capturing the electronic component including the component body 51 and the plurality of terminals 511 to 518 attached to the component body 51. The electronic component evaluation device 7 acquires, with respect to at least one of the terminals 511 to 518, the reference point information of the plurality of corresponding reference points Pm1 to Pm32 on the terminal, and includes a state determination unit 45 that determines a state according to a shape of the corresponding terminals 511 to 518 based on the plurality of pieces of reference point information.

In a configuration shown in FIG. 4, the electronic component evaluation device 7 includes a reference point information acquisition unit 44 that acquires the reference point information, and acquires the reference point information from the imaging data. However, the electronic component evaluation device 7 is not limited to a device having a configuration that acquires the reference point information, and may be a device to which the reference point information generated by another device is input. Additionally, the electronic component evaluation device 7 of the first embodiment includes a good-or-defective determination unit 36 that determines whether the electronic component 5 is a good product (OK) which can be shipped or a defective product (NG) which cannot be shipped, by comparing the determination result of the state determination unit 45 with a predetermined specification.

The electronic component evaluation device 7 includes a CPU that controls the entire functions of the state determination unit 45 and the good-or-defective determination unit 36 described above, a hardware device such as a memory device, and software for operating the hardware device. The memory device stores data and programs to be used for the control by the CPU or is used as a work memory of the CPU. The hardware device may be exclusive to the functions of the electronic component evaluation device 7 or may be also a general personal computer.

Each component shown in FIG. 4 will be described below.

(3D Camera)

Figure 5:
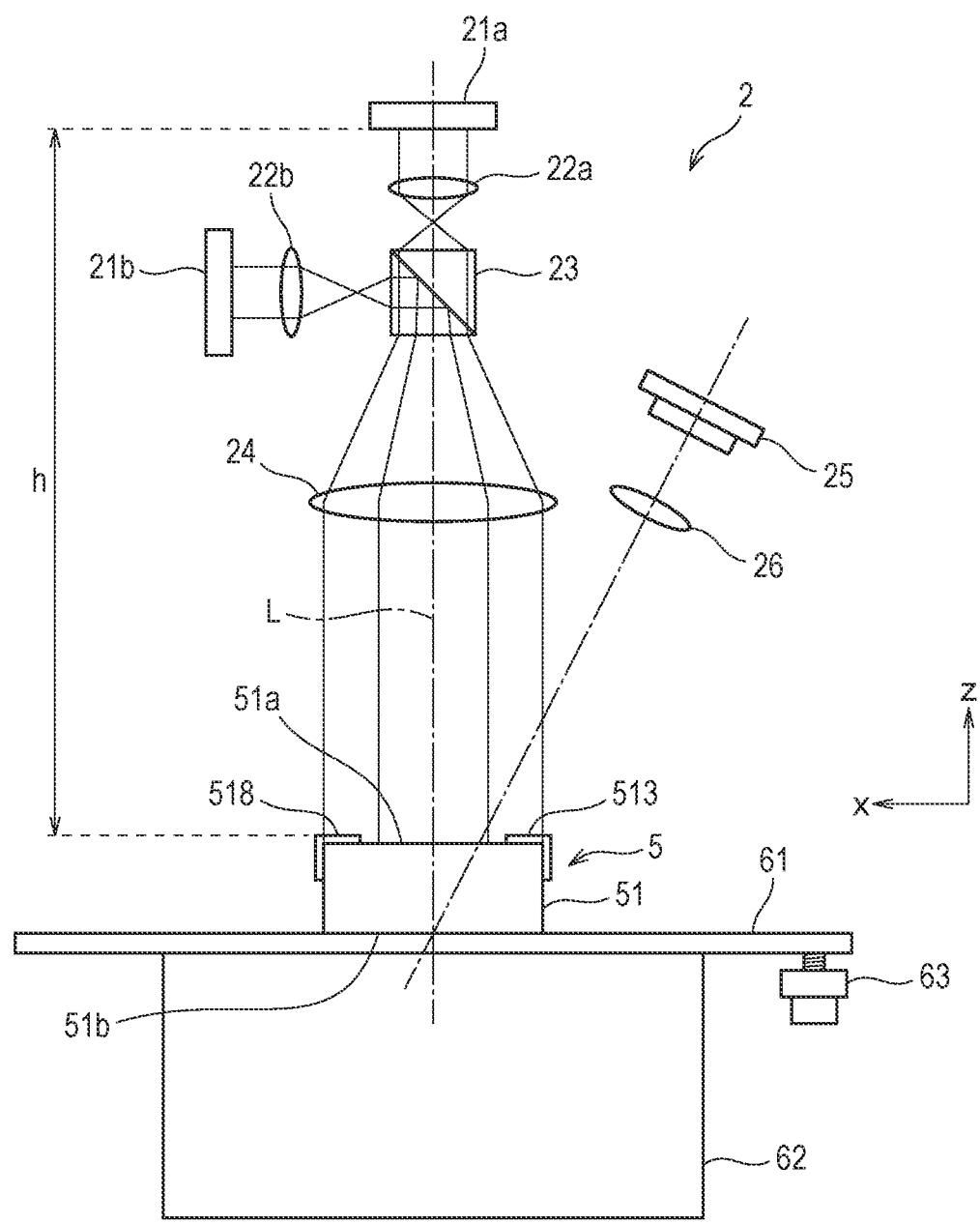
FIG. 5 is a diagram for illustrating a 3D camera shown in FIG. 4.

As shown in FIG. 5, the 3D camera 2 image-captures the electronic component 5 that is placed on a table including a base 62 and a top plate 61, from above the top plate 61. A height of the top plate 61 can be changed by an elevating and lowering screw 63. Accordingly, the 3D camera 2 can focus on the reference point of the electronic component 5, regardless of the height of the electronic component 5.

The electronic component 5 is placed in a state in which a bottom surface $51b$ comes in contact with the top plate 61, and an upper surface $51a$ faces the 3D camera 2. The 3D camera 2 includes a light source 25 that projects stripe-like line light obliquely with respect to the electronic component 5, a projection lens unit 26 that concentrates the projected line light on the upper surface $51a$, a condenser lens unit 24 that condenses the line light reflected by the upper surface $51a$, and guides the condensed light to a half mirror 23, CMOS sensors $21a$ and $21b$ that form an image in response to the light guided to the half mirror 23, and image forming lenses $22a$ and $22b$ that are located between the half mirror 23 and the CMOS sensors $21a$ and $21b$, respectively, and change light from the half mirror 23 to parallel light. The 3D camera 2 includes the two CMOS sensors $21a$ and $21b$ so that one of the sensors generates a low-magnification image in which the entirety of the electronic component 5 can be image-captured, and the other sensor generates a high-magnification image in which a part of the electronic component 5 can be observed. In the first embodiment, the high-magnification image is captured by the CMOS sensor $21a$.

Alternatively, such a system may include two 3D cameras 2 to image-capture the electronic component 5 from two different directions so that a shadow area is not generated on the image.

According to the configuration described above, the images that are formed on the CMOS sensors $21a$ and $21b$ are output, as imaging data, to an input unit 35 of the electronic component evaluation device 7 shown in FIG. 4. However, the 3D camera 2 of the first embodiment is not limited to the configuration in which the imaging data is output as described above. For example, the 3D camera 2 may include a range-finding unit (not shown in the drawing) that finds a coordinate of a reference point in the imaging data, and may output position information that is measured by the range-finding unit to the electronic component evaluation device 7.

Furthermore, in the first embodiment, distances between the 3D camera 2 and each of the terminals 511 to 518 are measured by a time of flight (TOF) method. In the 3D camera 2 described above, the range-finding unit (not shown in the drawing) detects, for each predetermined number of pixels, a period of time starting from projecting the line light to the electronic component 5 by the light source 25 until the reflected light is imaged in (received by) the CMOS sensors 21a and 21b. In the first embodiment, the 3D camera 2 projects stripe-like line light, and records a period of time corresponding to each beam of the line light in association with the corresponding beam of the line light.

The detected period of time is input to the state determination unit 45 via the input unit 35. However, the first embodiment is not limited to the configuration in which the period of time starting from projecting line light until the reflected light is received is input to the electronic component evaluation device 7. The range-finding unit (not shown in the drawing) may convert the period of time into a distance, and output the converted distance to the electronic component evaluation device 7.

Additionally, in the TOF method, a phase delay of the reflected light with respect to the projecting light may be measured when the line light is high-speed pulse light. However, the first embodiment is not limited to obtaining the height information using the TOF method, and the height information may be obtained by any other methods such as triangular range finding system, which can obtain the height from the imaging data.

(Input Unit)

In the case of directly inputting the imaging data from the 3D camera 2, the input unit 35 functions as an input interface for data. However, the first embodiment is not limited to connecting the 3D camera 2 to the electronic component evaluation device 7 to input the imaging data in real time. For example, the imaging data generated by the 3D camera 2 may be stored in a recording medium, and be input later from the input unit 35 to the electronic component evaluation device 7 to be processed. Furthermore, in the first embodiment, the 3D camera 2 and the electronic component evaluation device 7 may be installed at separate locations, and the imaging data generated by the 3D camera 2 may be transmitted to the electronic component evaluation device 7 through a network line or the like. According to such a configuration, a reception device provided in the electronic component evaluation device 7 functions as the input unit 35.

(Reference Point Information Acquisition Unit)

The reference point information acquisition unit 44 performs a process of step S501 shown in FIG. 3. In the acquisition of the reference point information, the reference point information acquisition unit 44 detects the reference points Pm1 to Pm32 on the terminals 511 to 518 from the imaging data, for example. With respect to detection of the reference points Pm1 to Pm32, for example, the reference point information acquisition unit 44 may detect each edge portion of the terminals 511 to 518 and determine a point of a specific pixel on the captured image that is spaced apart from a pixel of the detected edge portion on the captured image by a predetermined distance and in a predetermined direction, as a corresponding one of the reference points Pm1 to Pm32. Then, the reference point information acquisition unit 44 may calculate coordinates of the reference points Pm1 to Pm32 based on the directions and the distances of the pixels of the reference points Pm1 to Pm32 on the captured image from known coordinates of the pixels of the respective edge portions on the captured image, for example.

The reference point information acquisition unit 44 calculates a phase difference that is caused by a time difference between projection and the reception of the line light that is projected to the reference points Pm1 to Pm32 among beams of stripe-like line light, and calculates a distance h from the surface of the electronic component 5 to the CMOS sensor. The calculated height is the first height.

(State Determination Unit)

The state determination unit 45 performs a process of step S502 shown in FIG. 3. As shown in FIG. 2A, the terminal 511 and the like of the first embodiment each include the plane portion C that is along the mounting surface of the electronic component 5, and a plurality of reference points Pm are arranged on the plane portion C. In the first embodiment, an example will be described in which the state determination unit 45 determines degrees of inclination and directions of the terminal 511 and the like.

The state determination unit 45 can acquire the degree of inclination (height difference) of each measurement point from the coordinate and the first height of the reference point Pm acquired as described above. Furthermore, since the reference points are arranged on each of the planar terminal 511 and the like with a two-dimensional extension, a plurality of inclination directions may exist in the plane. In this case, the state determination unit 45 can identify and evaluate these directions. The state determination unit 45 of the first embodiment calculates an inclination in a plane direction of the top plate 61 on which the electronic component 5 is placed from the coordinates of the reference points Pm, and calculates inclinations of directions perpendicular to plane directions of the terminals 511 to 518 from the first heights of the reference points Pm.

Figure 6A:
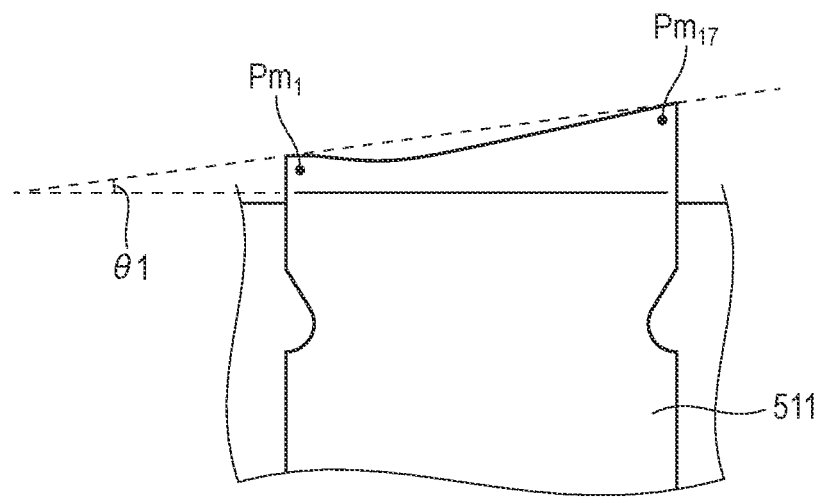
FIG. 6A is a diagram showing a state when viewing a terminal having an inclination from above.
Figure 6B:
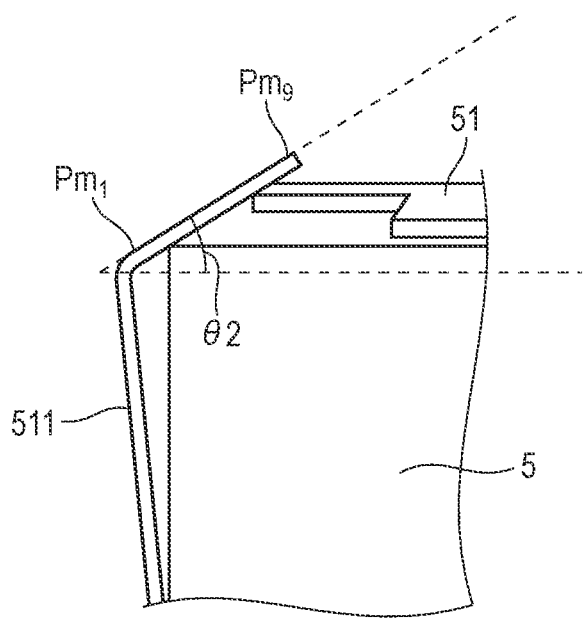
FIG. 6B is a diagram showing a state when viewing the terminal shown in FIG. 6A from a side.

FIGS. 6A and 6B each are a diagram illustrating the inclination of the terminal 511. FIG. 6A is a diagram showing the terminal 511 image-captured from the upper surface 51a shown in FIG. 5. FIG. 6B is a diagram showing a state when viewing the terminal 511 shown in FIG. 6A from the side. The state determination unit 45 acquires two-dimensional coordinates of the reference points Pm1, Pm9, Pm17, and Pm25 (partially not shown in FIG. 6A) shown in FIG. 2A from the image of FIG. 6A. The state determination unit 45 calculates an inclination θ1 of the terminal 511 in a direction of rotating around an axis perpendicular to the surface of the top plate 61 based on the coordinate of each reference point. Additionally, the state determination unit 45 acquires the first height information of the reference points Pm1, Pm9, Pm17, and Pm25, and calculates an inclination θ2 in a direction perpendicular to the surface of the top plate 61. According to the first embodiment, the state determination unit 45 can calculate not only the inclination θ1 in the plane direction but also the inclination θ2 in the direction perpendicular to the plane direction shown in FIG. 6B by image-capturing the terminal 511 in one direction from the upper surface 51a shown in FIG. 6A.

A plurality of electronic components are image-captured by the 3D camera 2 in a sequentially continuous manner. In the electronic component evaluation device 7, the state determination unit 45 determines a state of a terminal of a first electronic component 5 (hereinafter, referred to as a "preceding component") that is image-captured first, during at least part of a period of time between the completion of image capturing of the preceding component and the start of image capturing of a second electronic component 5 (hereinafter, referred to as a "subsequent component") that is image-captured later. Note that the preceding component is moved from an image capturing position of the 3D camera 2 on the top plate 61 after the completion of image capturing, and then the subsequent component is moved to the image capturing position. The preceding component and the subsequent component may be moved manually by the worker or automatically by robot arms or the like. Additionally, with respect to the movement of the preceding component and the subsequent component, the top plate 61 may be configured to be movable in one direction so that the preceding component and the subsequent component are arranged in the moving direction. Furthermore, in the first embodiment, the reference point information acquisition unit 44 may acquire the reference point information while the preceding component is replaced with the subsequent component.

In this way, the state determination unit 45 performs the process of determining the state of the terminal of the preceding component after the completion of image capturing of the preceding component, and during this process, the subsequent component can be set on the image capturing position and image-captured. That is, according to the first embodiment, a period of time during which the process of the preceding component is performed is set to partially overlap with a period of time during which the process of the subsequent component is performed, which can reduce the period of time necessary for continuous image-capturing of all of the plurality of electronic components 5 and the state evaluation processes.

Furthermore, in the first embodiment, an angle of view of the 3D camera 2 can be set so that the plurality of electronic components 5 can be image-captured at a time. In this way, the imaging data of the two electronic components 5 can be acquired by one image-capturing process, and the process time period can be further reduced. However, the period of time necessary for the image capturing process of the electronic component 5 is much longer than the period of time necessary for the state determination process of the state determination unit 45. Therefore, it is fully possible to determine the states of the two electronic components 5 during one image-capturing process.

As described above, the first embodiment is not limited to being applied to an electronic component including SOJ terminals, and can be also applied to an electronic component including a lead frame terminal, for example.

Figure 7A:
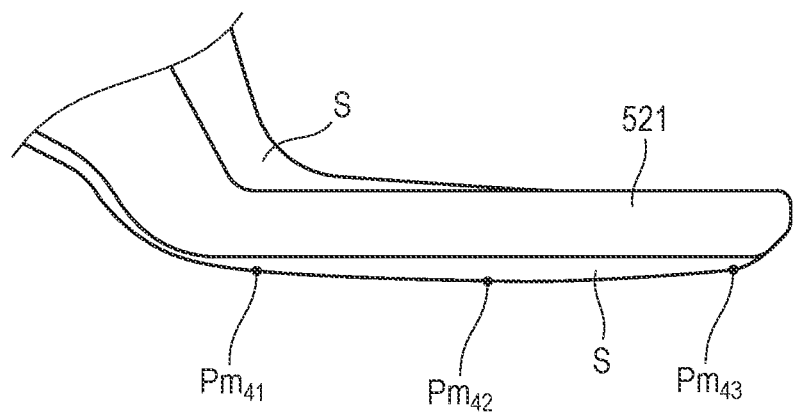
FIG. 7A is a diagram showing an example in which a plurality of reference points are set in a lead frame.

FIG. 7A is a diagram for illustrating a state in which a plurality of reference points Pm41, Pm42, and Pm43 are set on a lead frame 521. In an example shown in FIG. 7A, solder S is attached to the lead frame 521, and in the image, the reference points Pm41, Pm42, and Pm43 are set on an edge of the solder S. Such an image can be captured by image-capturing an electronic component 8 including the lead frame 521 from a side of an upper surface 81*a* in the same manner as the electronic component 5 (FIG. 4).

When the electronic component 8 is image-captured after the solder S is applied to the lead frame 521, in the captured image, the solder S exists on the surface of the lead frame 521, and the reference points Pm41, Pm42, and Pm43 are set.

However, the first embodiment is not limited to such a configuration. The lead frame 521 of the electronic component 8 may be image-captured before the solder S is applied, so that the reference points Pm41 to Pm43 are set on the lead frame 521.

Figure 7B:
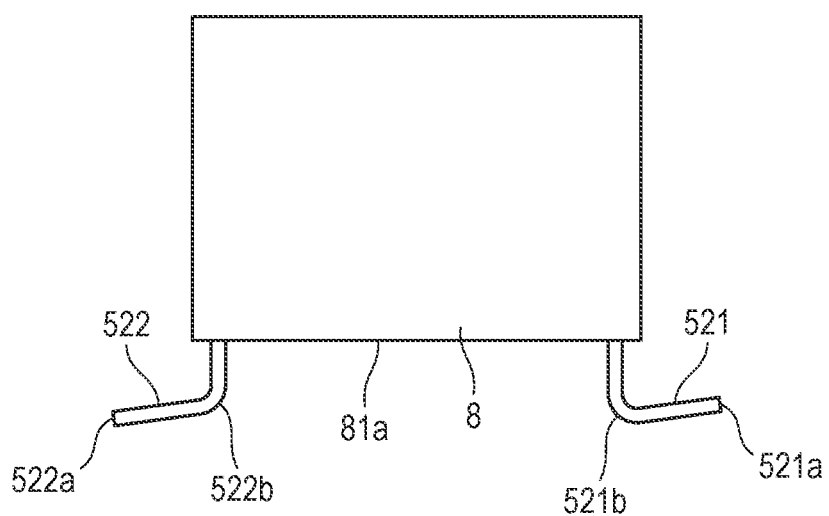
FIG. 7B is a diagram for illustrating determination as to whether an electronic component using the lead frame is a good product or a defective product.

FIG. 7B is a diagram for illustrating determination as to whether the electronic component 8 using the lead frame is a good product or a defective product. The electronic component 8 shown in FIG. 7B includes a component body 81 and a plurality of lead frames. In FIG. 7B, lead frames 521 and 522 are shown, but more lead frames are formed in the electronic component 8 toward the rear direction of FIG. 7B.

Various conditions are required for the state of the terminal of the electronic component. For example, it can be determined whether the lead frame 521 is inclined upward from a base portion 521*b* to a front end portion 521*a* or the lead frame 522 is inclined downward from a base portion 522*b* to a front end portion 522*a*, as shown in FIG. 7B.

For example, in the determination of a good product or a defective product, according to the specification in which it is determined as NG in a case where a lead frame is inclined toward the front end portion 521*a* in a direction of separating from the mounting substrate as in the lead frame 521, the electronic component 8 is determined as a defective product. According to the specification in which it is determined as NG in a case where a lead from is inclined downward toward the front end portion 522*a* as in the lead frame 522, the electronic component 8 is determined as a defective product. Furthermore, in a case where it is determined whether the electronic component 8 is a good product or a defective product according to the magnitude of the inclined angle regardless of the inclined direction of the lead frame, the state determination unit 45 determines whether the electronic component 8 is a good product or a defective product according to the determined inclined angles of the lead frame 521 and the lead frame 522.

The good-or-defective determination unit 36 previously acquires determination data of predetermined criteria whether the electronic component 5 is a good product or a defective product. For example, the determination data may be acquired through a network line or by connecting the recording medium storing the determination data to the electronic component evaluation device 7. The determination data is replaceable according to the type of the electronic component 5 or the product type. The good-or-defective determination unit 36 can correspond to various electronic components 5.

As described above, in the first embodiment, with respect to at least one of a plurality of terminals, a plurality of reference points are defined on the terminal. Since the state according to the shape of the terminal is determined based on the information of the positions and first heights of the reference points, the inclination of the terminal can be detected with respect to a plurality of directions of the terminal by one image-capturing process, and the shape of each terminal can be determined easily and with high accuracy.

Additionally, the first embodiment has been described using an example in which the state of the inclination of one terminal is determined, but the first embodiment is not limited to such a configuration. For example, in the first embodiment, the shapes of the plurality of terminals may be detected to determine whether adequate electrical conduction between the terminals and the mounting substrate is obtained (whether the electronic component is a good product or a defective product) even when the electronic component is inclined. In this way, in the first embodiment, it can be estimated not only the shape of one terminal but also the states of the terminals such as floating and electrical conduction that are determined according to the shapes of the plurality of terminals.

Second Embodiment

Next, a second embodiment of the present invention will be described. In the second embodiment, the states such as floating of a plurality of terminals 511 to 518 and an inclination of an electronic component 5 with respect to a mounting surface that are determined according to shapes of the terminals are determined, whereas in the first embodiment, individual shapes of the terminals 511 to 518 are determined. The second embodiment will be described using an example in which a electronic component evaluation device 3 evaluates an inclination (flatness) of the electronic component 5.

The "flatness" here refers to a degree of turning of the electronic component 5 around a horizontal axis when the electronic component 5 is placed on a horizontal surface. In a case where the electronic component 5 performs the above-described turning with respect to the surface on which the electronic component 5 is placed, the electronic component 5 may be brought into contact with a plurality of virtual surfaces with different inclinations. In the second embodiment, the flatness of the electronic component 5 is detected for each of the plurality of virtual planes, and thus, the flatness of the electronic component 5 may be guaranteed for each plane.

(Electronic Component Evaluation Method)

Figure 9:
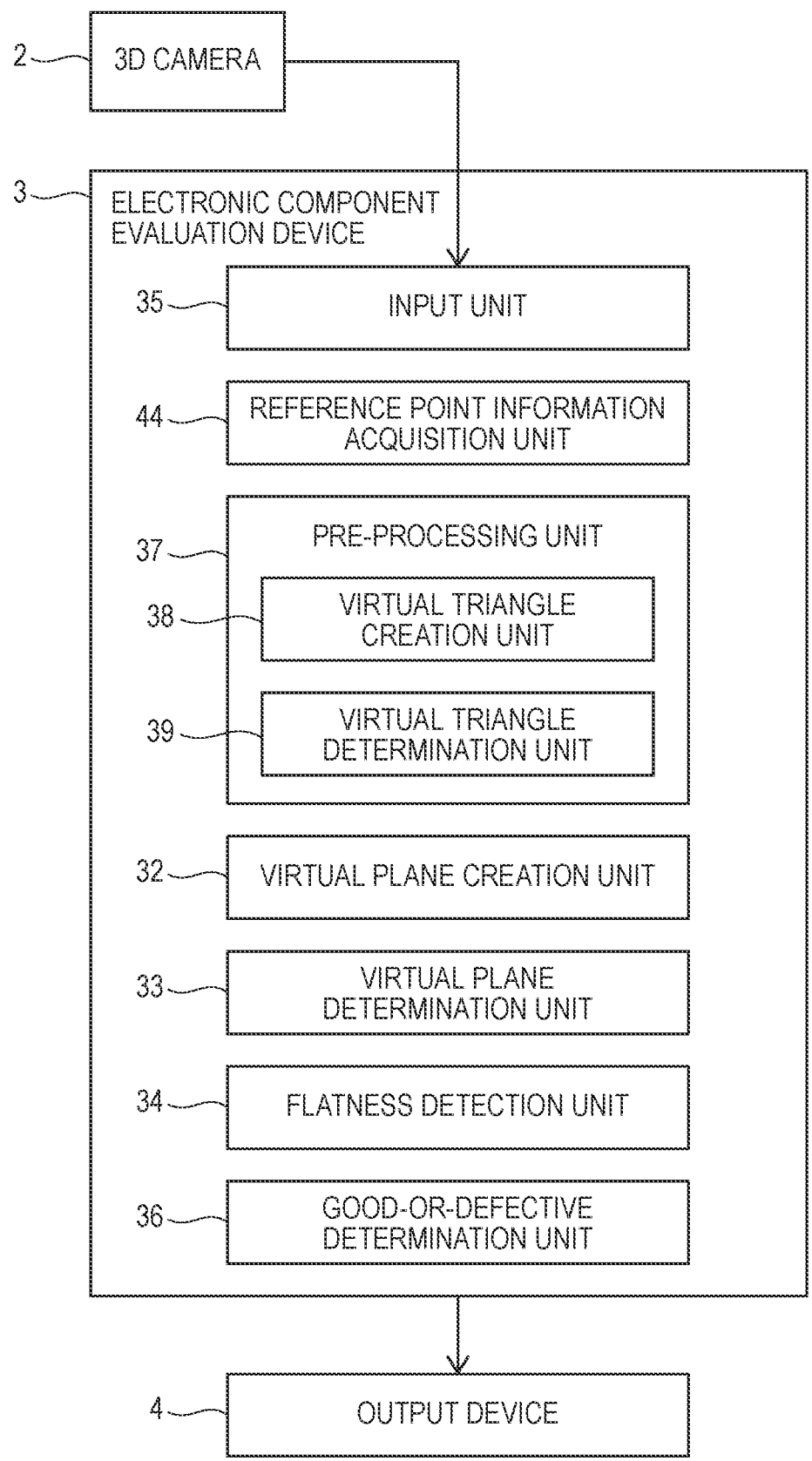
FIG. 9 is a block diagram for illustrating an electronic component evaluation system including a electronic component evaluation device of the second embodiment.

FIG. 8 is a flowchart for illustrating an electronic component evaluation method performed using the electronic component evaluation device 3 of the second embodiment. FIG. 9 is a functional block diagram for illustrating the electronic component evaluation device 3 that performs processes shown in FIG. 8, and shows an electronic component evaluation system 1 in which a 3D camera 2 and an output device 4 are combined with the electronic component evaluation device 3.

In an electronic component evaluation method of the second embodiment, determining a state includes creating a virtual plane based on position information and first height information of at least three selected points selected from a plurality of reference points (step S605), and determining a virtual plane, based on second height information that takes, as a reference, the virtual plane of the reference points excluding the selected points, whether the virtual plane is a valid plane or an invalid plane (step S607). In the second embodiment, a flatness of a terminal group including a plurality of terminals is detected relative to the valid plane as a reference.

Here, the terminal group refers to a plurality of terminals among the terminals 511 to 518, and need not include all the terminals 511 to 518. The flatness of the terminal group is represented by distances between the plurality of terminals included in the terminal group and the valid plane. As described later, as the variation among the distances between the plurality of terminals included in the terminal group and the valid plane is increased, "looseness" of the electronic component 5 is increased.

As shown in FIG. 9, the electronic component evaluation device 3 that performs the above-described processes includes an input unit 35, a reference point information acquisition unit 44, a pre-processing unit 37, a virtual plane creation unit 32, a virtual plane determination unit 33, a flatness detection unit 34, and a good-or-defective determination unit 36. The pre-processing unit 37 includes a virtual triangle creation unit 38 and a virtual triangle determination unit 39. The input unit 35 and the reference point information acquisition unit 44 perform step S601 shown in FIG. 8. The pre-processing unit 37 and the virtual plane creation unit 32 perform step S605. The virtual plane determination unit 33 performs step S607. The flatness detection unit 34 detects the flatness of the terminal relative to, as a reference, the valid plane determined in step S607.

Such a configuration will be specifically described below.
(Reference Point Information Acquisition Unit)

In the second embodiment, the reference point information acquisition unit 44 performs a step of acquiring reference point information (step S601). In step S601, with respect to the eight (m) terminals 511 to 518 each having four (n) reference points, a process of measuring the reference points on the different terminals in a preset order is repeated four cycles. In the second embodiment, with respect to the terminals 511 to 518, the reference point information is acquired in the order of the terminals 511, 518, 517, 516, 515, 514, 513, and 512. At this time, in the second embodiment, the reference point information of a corresponding one among the four reference points on each terminal is acquired. When one cycle is completed, the reference point information of another reference point is acquired in the order of the terminals 511, 518, 517, 516, 515, 514, 513, and 511 again.

Specifically, the reference point information acquisition unit 44 acquires the reference point information of the reference points Pm1 to Pm8 in a first cycle. Next, the reference point information acquisition unit 44 acquires the reference point information of the reference points Pm9 to Pm16 in a second cycle, acquires the reference point information of the reference points Pm17 to Pm24 in a third cycle, and acquires the reference point information of the reference points Pm25 to Pm32 in a fourth cycle.

Next, the reference point information acquisition unit 44 associates each of numbers indicating the order of acquisition of the reference point information with the corresponding acquired reference point information, and combines, into one group, the reference points with the respective numbers indicating the order, each of which is divided by eight (m) to obtain the same remainder, and the reference point information corresponding to each of the numbers indicating the order having the above-described remainder.

That is, in the second embodiment, the numbers 1, 2, to 32 following the reference point Pm indicate the order of acquisition of the reference point information. Each of the numbers indicating the order is divided by eight. As a result, when each of the numbers indicating the order with respect to the reference points Pm1, Pm9, Pm17, and Pm25 on the terminal 511 is divided by eight, the remainder becomes 1. The reference point information acquisition unit 44 stores the reference point information acquired as described above in association with corresponding each of the reference points Pm1, Pm9, Pm17, and Pm25, and combines the reference points Pm1, Pm9, Pm17, and Pm25 into one group. Such processes enable the reference point information of the reference points on the same terminal to be grouped automatically and easily. Note that this process reduces the load of a virtual triangle creation process which will be performed later.

(Pre-Processing Unit)

The pre-processing unit 37 includes the virtual triangle creation unit 38 and the virtual triangle determination unit 39. The virtual triangle creation unit 38 selects three reference points from 32 reference points. Then, the virtual triangle creation unit 38 acquires the reference position information of the selected three reference points. Furthermore, the virtual triangle creation unit 38 creates a triangle that takes each reference point as a vertex. According to such processing, $_{32}C_3$ pieces of virtual triangles are created.

To reduce the above-described process amount, in the second embodiment, in a case where the electronic component 5 includes four or more terminals, in creating the virtual plane, it is processed not to create the virtual plane passing through a plurality of selected points on one terminal. This is because the triangle created by selecting a plurality of reference points on the same terminal is determined as being excluded from creation of the virtual plane in the determination of the virtual triangle which is described later. In the second embodiment, the number of reference points to be processed is reduced prior to creation of the virtual triangle to reduce the process amount of the pre-processing unit 37. However, in the second embodiment, in a case where the electronic component 5 includes two terminals, the virtual triangle creation unit 38 may create the virtual plane passing through the two selected points on one terminal.

Next, the virtual triangle creation unit 38 of the second embodiment creates a triangle (virtual triangle) taking the selected three reference points Pm as vertices. The virtual triangle is a surface closer to the CMOS sensor 21a than the upper surface 51a (hereinafter, also referred to as "above") in FIG. 5.

The virtual triangle creation unit 38 creates the virtual triangle for all the combinations while changing the combination of the three selected terminals.

Figure 10A:
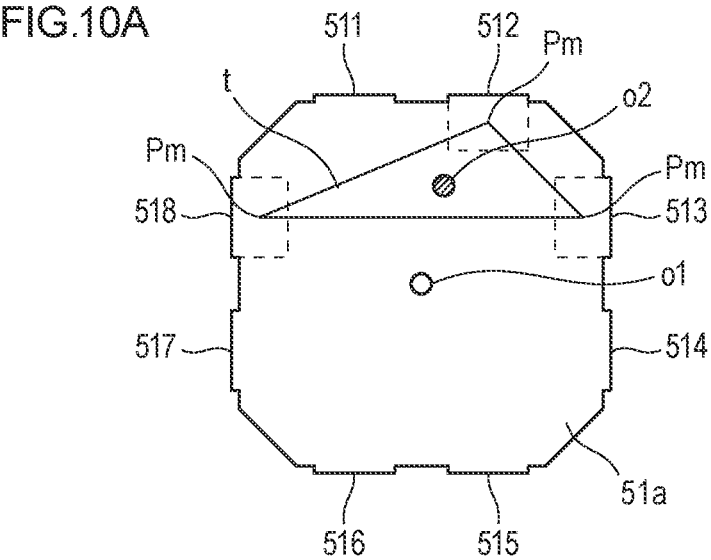
FIG. 10A is a diagram for illustrating pre-processing of the second embodiment and showing an example of an invalid triangle.
Figure 10B:
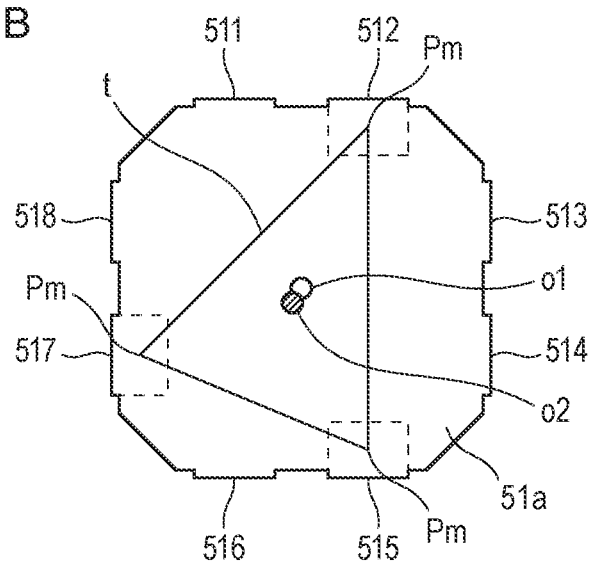
FIG. 10B is a diagram showing an example of a valid triangle.
Figure 10C:
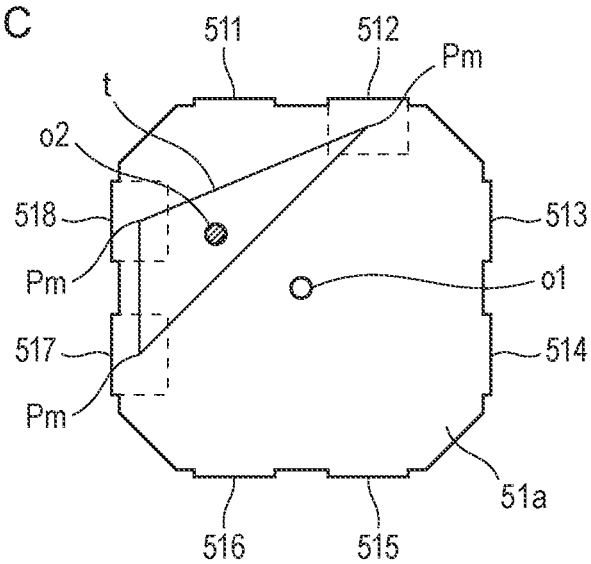
FIG. 10C is a diagram showing an example of an invalid triangle.

FIGS. 10A, 10B, and 10C each are a diagram for specifically illustrating the pre-processing that is performed by the pre-processing unit 37. In the pre-processing, the virtual triangle determination unit 39 determines whether a virtual triangle is invalid (invalid triangle) or valid (valid triangle), based on a distance between a specified point that is specified on the electronic component 5 by the reference point information acquired by the input unit 35 and the reference point information acquisition unit 44, and a design point that is specified in designing of the component. In the second embodiment, the specified point of the electronic component 5 is a centroid point o2 of a virtual triangle t that takes the reference points Pm of the respective three terminals as the vertices. Additionally, the design point is a centroid point o1 of the electronic component 5. In a case where a distance between the centroid point o2 of the virtual triangle t and the centroid point o1 is equal to or less than a preset threshold, the virtual triangle determination unit 39 determines that the virtual triangle t is a valid triangle.

FIG. 10A shows a virtual triangle t that takes the reference points Pm on the terminals 512, 513, and 518 as the vertices, and the centroid point o1. In the example shown in FIG. 10A, the centroid point o1 and the centroid point o2 of the virtual triangle t are separated by more than the threshold. Accordingly, the virtual triangle determination unit 39 determines the virtual triangle t that takes the reference points Pm on the terminals 512, 513, and 518 as the vertices to be an invalid triangle. FIG. 10B shows a virtual triangle t that takes the reference points Pm on the terminals 512, 515, and 517 as the vertices, and the centroid point o1. In the example shown in FIG. 10B, the distance between the centroid point o1 and the centroid point o2 is equal to or less than the threshold. Accordingly, the virtual triangle determination unit 39 determines the virtual triangle t that takes the reference points Pm on the terminals 512, 515, and 517 as the vertices to be a valid triangle. FIG. 10C shows a virtual triangle t that takes the reference points Pm on the terminals 512, 517, and 518 as the vertices, and the centroid point o1.

In the example shown in FIG. 10C, the centroid point o1 and the centroid point o2 are separated by more than the threshold. Accordingly, the virtual triangle determination unit 39 determines the virtual triangle that takes the reference points Pm on the terminals 512, 517, and 518 as the vertices to be an invalid triangle.

Note that, in the second embodiment, since in a case where the electronic component 5 includes four or more terminals, the virtual plane passing through a plurality of reference points on the same terminal is not created, a triangle that takes such reference points as the vertices is not created, whereby the determination of valid or invalid is not made. According to such processing, the electronic component evaluation device 3 of the second embodiment can further reduce the amount of arithmetic operations.

Additionally, the pre-processing is not limited to the example described above. For example, in the pre-processing, the design point is not limited to the centroid point o1, and the specified point is not limited to the centroid point o2, and the design point and the specified point may be any points that enable an inclination of the entire electronic component 5 to be effectively estimated. For example, in the second embodiment, a center point, in the designing of the component body 51 of the electronic component 5 seen from above may be taken as the design point, and be compared with a center point of the virtual triangle t.

According to such pre-processing, in many cases, a virtual triangle that is specified by three terminals including adjacent terminals, among the terminals 511 to 518, is determined to be an invalid triangle. This is because such three terminals are highly likely not able to support the electronic component 5.

With the processing described above, a virtual plane reflecting a local inclination or unevenness of the upper surface 51a can be prevented from being adopted as the valid plane.

(Offset Processing)

Figure 11A:
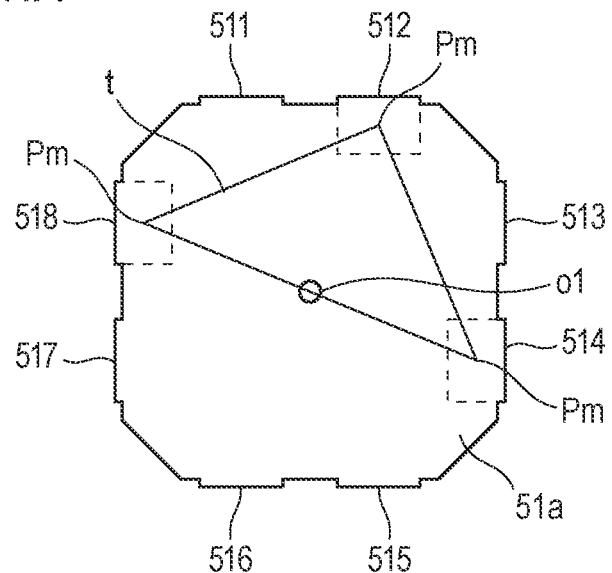
FIG. 11A is a diagram showing an electronic component to be subjected to offset processing in the pre-processing.
Figure 11B:
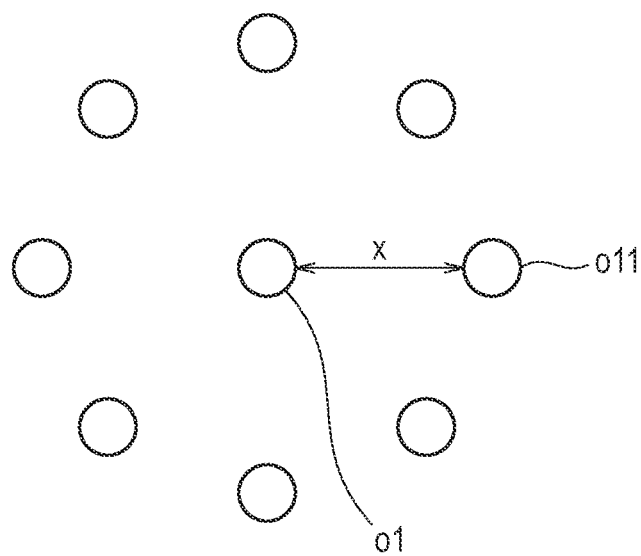
FIG. 11B is a diagram for illustrating a specific example of the offset processing.

Furthermore, in the pre-processing, the virtual triangle t may be recognized to be a valid triangle, in a case where the centroid point o1 is included in the virtual triangle t. In such a case, variation in determining the virtual triangle t to be a valid triangle due to variations in manufacture and measurement of a product is reduced as follows. FIGS. 11A and 11B each are a diagram for illustrating offset processing that reduces variation in determination, in a case where it is determined whether the centroid point o1 is located inside or outside the virtual triangle. FIG. 11A shows an electronic component to be subjected to the offset processing, and FIG. 11B shows a specific example of the offset processing.

The offset processing is processing that is performed in processes of selecting three reference points from a plurality of reference points Pm to create a triangle, and determining, as a valid triangle, the triangle in which the centroid point o1 of the electronic component is within the triangle. In the offset processing, in a case where the centroid point o1 is located on a side of the triangle, a point o11 spaced apart from the centroid point o1 by a distance x is set. In the offset processing of the second embodiment, in a case where the point o11 is within the triangle, the triangle is determined as a valid triangle.

Specifically, as shown in FIG. 11A, in the electronic component to be subjected to the offset processing, a virtual triangle t is created so that the side of the triangle passes through the centroid point o1. In such an electronic component, the triangle t that should be determined to be a valid triangle may be determined to be an invalid triangle due to variation in determining whether the triangle t is a valid triangle. Conversely, the triangle t that should be determined to be an invalid triangle may be determined to be a valid triangle. Accordingly, in the second embodiment, the variation in the terminal height used for good-or-defective determination which is made later is increased, and reliability of the measurement of the terminal height is reduced. The offset processing is processing which is effective to reduce the variation of the terminal height at the time of the good-or-defective determination and improve accuracy of the determination.

With respect to the electronic component illustrated in FIG. 11A, as shown in FIG. 11B, the centroid point o1 is moved in a plurality of directions by the distance x to determine whether the centroid point o11 falls within the triangle t after the movement. In the example shown in FIG. 11B, eight points o11 in total are arranged at equal intervals on the circumference of a circle of a radius x such that the centroid point o1 is located at the center of the circle. Such eight points o11 are arranged in a state in which adjacent ones are displaced from each other by 45 degrees. The distance x may be determined based on the pixel of the captured image of the electronic component. At this time, for example, a position of the pixel that is away by a few pixels from the centroid point o1 can be regarded as the point o11.

In the offset processing of the second embodiment, in a case where any one of the eight points o11 is located inside the triangle t, the triangle t is determined as a valid triangle. Then, a process of creating of a virtual plane is performed later using the triangle t determined as a valid triangle.

(Virtual Plane Creation Unit)

The virtual plane creation unit 32 creates a virtual plane based on the position information and the first height information of at least three selected points. At this time, the virtual plane creation unit 32 extracts only a valid triangle based on the determination result of the virtual triangle determination unit 39. Then the virtual plane creation unit 32 creates a virtual plane based on the reference point information of the three reference points Pm which are the vertices of the valid triangle (step S605). The virtual plane is a plane that passes through the three reference points Pm, and creation of the virtual plane in the second embodiment is performed by creating an arithmetic expression representing such a plane, or a collection of data representing points included in the plane.

(Virtual Plane Determination Unit)

Next, the virtual plane determination unit 33 determines, based on second height information that takes, as a reference, the virtual plane of the reference points excluding the selected points, whether the virtual plane is a valid plane or an invalid plane. Then, the virtual plane determination unit 33 detects flatness of the terminal by taking the valid plane as a reference.

That is, the virtual plane determination unit 33 converts, for all the reference points Pm1 to Pm32, the height information (the first height) which is expressed by the distance h from the CMOS sensor 21a to the reference point Pm, into height information (second height) of each reference point Pm to the virtual plane created by the virtual plane creation unit 32. This conversion causes a reference height for the height information to be changed from a light-receiving surface of the CMOS sensor 21a to the virtual plane. Additionally, a reference for the height information before conversion is not limited to the light-receiving surface of the CMOS sensor 21a, and may be an arbitrary point.

The virtual plane determination unit 33 determines whether a plurality of virtual planes created by the virtual plane creation unit 32 are valid planes or invalid planes. In the second embodiment, a valid plane here simulates a surface of a mounting substrate on which the electronic component 5 is appropriately mounted. The valid plane is not limited to one plane, and there may be a plurality of valid planes, depending on a direction of placement of the electronic component 5, a position of a center of gravity in a placed state of the electronic component 5, and the like. An invalid plane is obtained by excluding virtual planes that are determined as the valid planes from all the virtual planes.

The virtual plane determination unit 33 calculates, from each virtual plane, the height information of the reference points Pm on the terminals other than the three selected points, using the plurality of virtual planes created by the virtual plane creation unit 32 as points of reference, and analyzes the height information. As a result, in a case where, with respect to one virtual plane, the reference point Pm is at a position further away from the electronic component 5 than the virtual plane, or in other words, in a case where an arithmetic result indicating that the terminal protrudes above the virtual plane is obtained, the virtual plane determination unit 33 determines the virtual plane to be an invalid plane. The virtual plane that is determined to be an invalid plane is removed from the valid planes.

The reason for such processing is that, if the reference point Pm protrudes above the virtual plane, the terminal of the electronic component 5 becomes embedded in a mounting surface when the electronic component 5 is mounted with the terminal facing the mounting surface. As shown in FIGS. 1A to 2, the second embodiment is applied to the surface mounting type terminals 511 to 518, and the virtual plane is determined to be an invalid plane, assuming that the terminals 511 to 518 are not supposed to be embedded in the mounting surface.

In other words, in the actual mounting, it is impossible to embed the terminal in the mounting surface, and thus, a virtual plane for which an arithmetic result indicating that the reference point Pm is present above is obtained is different from the actual mounting surface. To determine a mounting surface according to an actual state, a virtual plane for which a result described above is obtained is removed from the valid planes.

Additionally, in the second embodiment, a case where the height information indicates that the reference points Pm1 to Pm32 protrude above the virtual plane will hereinafter also be described as the terminal corresponding to the reference points Pm1 to Pm32 being higher than the virtual plane. Conversely, in the second embodiment, a case where the height information indicates that the reference points Pm1 to Pm32 protrude below the virtual plane will hereinafter also be described as the terminal corresponding to the reference points Pm1 to Pm32 being lower than the virtual plane. In a case where the terminal is lower than the virtual plane, the terminal is "floating" between the electronic component 5 and the mounting surface.

(Flatness Detection Unit)

The flatness detection unit 34 calculates flatness (inclination) of the electronic component 5 based on the height of the reference points Pm1 to Pm32 on each terminal from a valid plane, by using only the virtual plane which is determined by the virtual plane determination unit 33 to be the valid plane. The flatness in the second embodiment is an index for "looseness" when the electronic component 5 is placed on a mounting substrate (not shown in the drawing). Looseness is caused when the reference points Pm1 to Pm32, that is, heights of the terminals 511 to 518 are varied due to an inclination of the electronic component 5, attachment angles of the terminals, or the like. Accordingly, in the second embodiment, the flatness is detected by the flatness detection unit 34 detecting heights of the terminals 511 to 518 by taking the valid plane as a reference. However, in a case where the electronic component 5 is obliquely in contact with the top plate 61, the heights of the terminals cannot be accurately detected. Accordingly, in the second embodiment, the heights of the reference points Pm1 to Pm32 are measured by taking only the valid plane as a reference, and the height of each terminal from the valid plane may be accurately detected regardless of the inclination of the electronic component 5.

The flatness detection unit 34 detects the heights from the valid plane for all of the reference points Pm1 to Pm32. In the second embodiment, in detecting the flatness, the valid plane is taken as a reference (0), and distances from 0 to each of the reference points Pm1 to Pm32 are taken as the heights of the reference points Pm1 to Pm32 as a second height, for example. The heights from the valid plane to each of the reference points Pm1 to Pm32 indicate the flatness of the electronic component 5. Furthermore, in the second embodiment, in a case where a plurality of virtual planes are determined to be valid planes, the flatness detection unit 34 may detect the flatness with respect to each of the plurality of valid planes. Then, a maximum value and a minimum value of the terminal height may be determined among a plurality of pieces of flatness determined by taking the plurality of valid planes as a reference, or a mean value may be determined.

(Good-or-Defective Determination Unit)

For example, in a case where the height of the reference points Pm1 to Pm32 is not within a predetermined allowable range, the good-or-defective determination unit 36 determines that the electronic component 5 including the reference points Pm1 to Pm32 is a defective product. In a case where the heights of all the reference points Pm1 to Pm32 are within the allowable range, the electronic component 5 including the terminals is determined to be a good product.

In the second embodiment, in a case where a plurality of valid planes are obtained, flatness may be calculated by taking, as a reference, a valid plane which is most disadvantageous for determination of the electronic component 5 as a good product, among the plurality of valid planes that are obtained. A valid plane which is most disadvantageous for determination of the electronic component 5 as a good product is a valid plane with respect to which a height of the reference points Pm1 to Pm32 is closest to an upper limit or a lower limit of the allowable range, for example. In the second embodiment, a margin may thus be sufficiently secured for inspection of the electronic component 5, and reliability can be increased.

Figure 12:
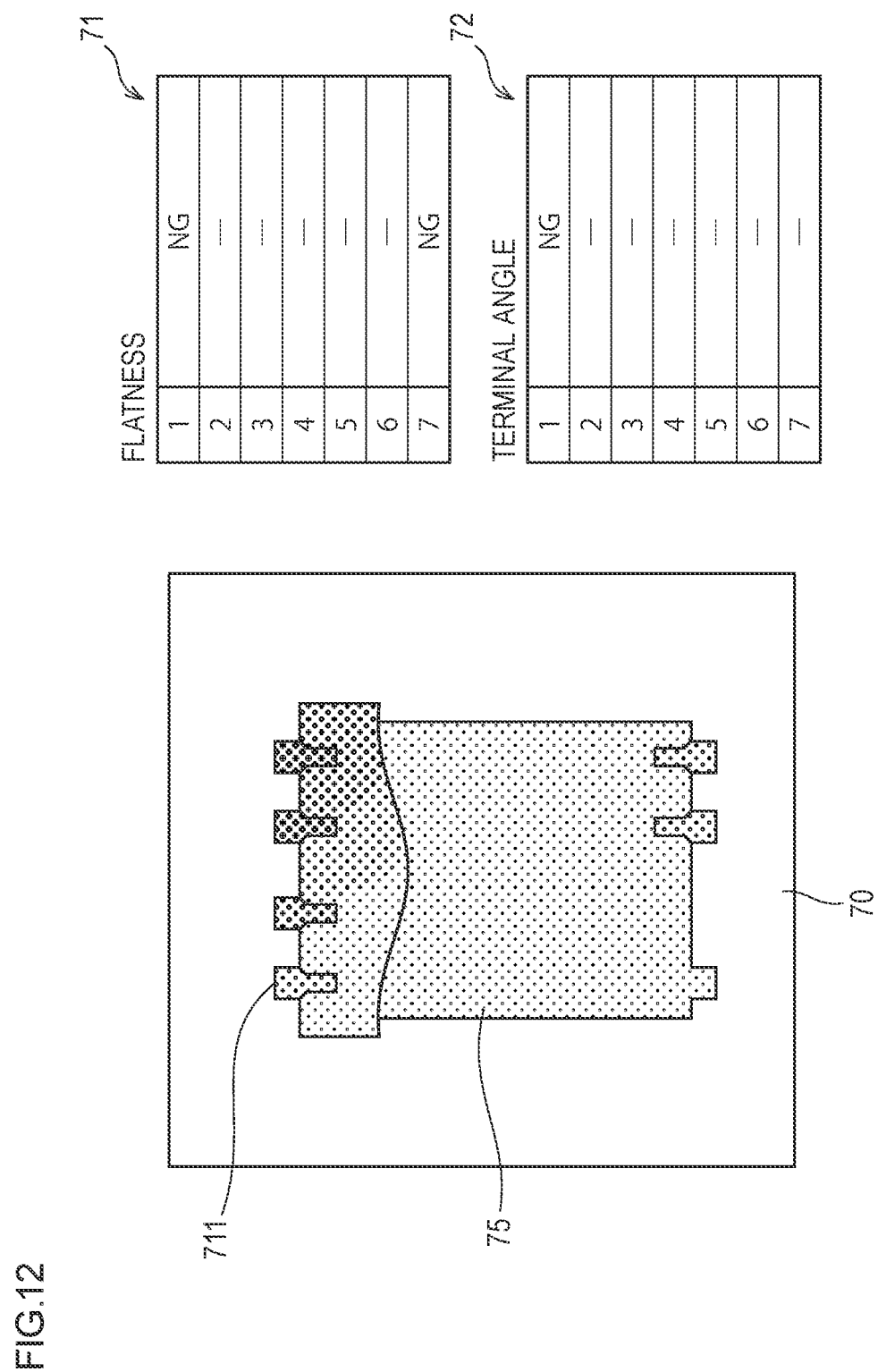
FIG. 12 is a diagram illustrating results that are output to an output device of the second embodiment.

FIG. 12 is a diagram illustrating results that are output to the output device 4, and shows an image 70 that is displayed on a display screen (not shown in the drawing) of the output device 4, or that is output being printed on a sheet of paper or the like. The image 70 is a color image showing, in color, a height of an upper surface of an electronic component 75 including seven terminals 711. In the second embodiment, also in the example shown by the image 70, the electronic component 75 is inspected by measuring heights of reference points on the terminals 711 by taking a valid plane as a reference. Additionally, in the example shown in FIG. 12, the reference points are grouped by terminals, and a good or defective product of the electronic component 75 is displayed for each terminal.

In the second embodiment, images 71 and 72 are also displayed on the display screen of the output device 4, together with the image 70. The image 71 shows the plurality of terminals 711 that are specified by identification numbers 1 to 7, and an inspection result of the height of each terminal. In the inspection result shown in the image 71, "NG" is determined for the terminal having at least one reference point among the four reference points, the height of which from the valid plane as a reference is not within the allowable range. A sign "-" is shown for the terminal having the reference points, the heights of all the reference points being within the allowable range.

In a case where NG is determined for any of the plurality of terminals, as shown in FIG. 8, the electronic component 5 is determined to be a defective product.

Also in the first embodiment described above, the virtual plane is obtained as in the second embodiment, so that the angle of the terminal with respect to the valid virtual plane can be determined. The image 72 shows an example in which the valid plane is created by the electronic component evaluation method of the first embodiment, and the angle with the valid plane is measured. In the image 72, "NG" is determined for the terminal having the inclination which is greater than the allowable range. A sign "-" is shown for terminal, the inclination angle of which is within the allowable range.

As described above, according to the electronic component evaluation method of the second embodiment, the heights of the reference points and thus the terminals can be detected based on the valid virtual plane, whereby the degree of inclination when the electronic component is mounted can be detected before the electronic component is mounted. The second embodiment can reduce the possibility that the electronic component is mounted and then the manufactured apparatus and component are determined as defective products, and increase reliability of the electronic component. Additionally, in the electronic component evaluation method of the first embodiment, the inclination angle from the valid virtual plane can be evaluated so that the state according to the shape of each terminal when the terminal is mounted can be determined before the terminal is mounted. Such a configuration can correspond to various inspection according to specifications and use of the electronic component.

Additionally, the second embodiment is not limited to the above-described configuration. A description is given assuming that detection of flatness of the electronic component 5 including terminals is performed in an order of creation of a virtual triangle, determination of a valid triangle or an invalid triangle, creation of a virtual plane, detection of a terminal height, determination of a valid plane or an invalid plane, statistical processing (detection) on flatness, and determination of a good product or a defective product. However, the second embodiment is not limited to such an order, and the steps described above may be performed in a different order. For example, creation of a virtual plane based on three reference points Pm (triangle), statistical processing regarding heights of the reference points Pm of all the terminals from such virtual planes, determination of a valid plane, determination of degrees of offset of a center and a centroid of the triangle on the valid plane, statistical processing with respect to flatness using the heights of the terminals on the valid plane including a valid triangle, and determination of a good product or a defective product may be performed in such an order.

In the first embodiment and the second embodiment described above, an example in which a housing package is provided as the electronic component is described, but the present invention can be applied not only to the electronic component having a package, but also to any other configurations in which the electronic component is mounted in a plane.

FIG. 13 is a diagram for illustrating an example in which the electronic component evaluation method of the first embodiment or the second embodiment is applied to another electronic component. The electronic component shown in FIG. 13 is a surface mount type air core coil including a terminal portion 85 and a wire-wound portion 86. According to the first embodiment and the second embodiment of the present invention, even in such an air core coil, 12 reference points Pm111 to Pm1112 are set on the two terminal portions 85 so that the surface distribution of the heights of the terminal portions 85 can be measured. Then, the air core coil can be determined to be a good product or a defective product based on whether the heights are within the allowable range.

The embodiments described above include the following technical ideas.

(1) An electronic component evaluation method of evaluating a state of an electronic component based on imaging data obtained by image-capturing the electronic component including a component body, and a plurality of terminals attached to the component body, the method comprising:

acquiring, with respect to at least one of the plurality of terminals, reference point information including at least one of position information and first height information of a plurality of reference points of the terminal; and determining a state according to a shape of the electronic component based on a plurality of pieces of the reference point information.

(2) The electronic component evaluation method according to (1), wherein said determining the state includes creating a virtual plane based on position information and first height information of at least three selected points selected from a plurality of reference points, and determining, based on second height information that takes, as a reference, the virtual plane of the reference points excluding the selected points, whether a virtual plane is a valid plane or an invalid plane, and in said determining, a flatness of a terminal group including a plurality of terminals is detected relative to the valid plane as a reference.

(3) The electronic component evaluation method according to (2), wherein in said creating the virtual plane, in a case where the electronic component includes the two terminals, a virtual plane passing through the two selected points on the one terminal is created, and in a case where the electronic component includes the four or more terminals, a virtual plane passing through a plurality of the selected points on the one terminal is not created.

(4) The electronic component evaluation method according to any one of (1) to (3), wherein the terminal includes a bent portion that is bent along the component body, and a plane portion that is along a mounting surface of the electronic component, the method further comprising:

prior to said acquiring the reference point information, preliminarily capturing a three-dimensional image of an entire surface on a mounting surface side of the electronic component, and generating an entire image identifying at least a difference in height between the bent portion and the plane portion, in said preliminary capturing and generating, the reference points are selected from an inner side of the plane portion with respect to a boundary between the bent portion and the plane portion.

(5) The electronic component evaluation method according to any one of (1) to (4), wherein with respect to the "m" terminals each having "n" reference points, a process of acquiring the reference point information of the different terminals in a preset order is repeated n cycles, and each of numbers indicating the order is associated with the corresponding acquired reference point information, and combines, into the same group, the reference points with the respective numbers indicating the order, each of which is divided by "m" to obtain the same remainder, and the reference point information corresponding to each of the numbers indicating the order having the remainder.

(6) The electronic component evaluation method according to any one of (1) to (5), wherein the terminal includes a plane portion that is along a mounting surface of the electronic component and a plurality of the reference points are arranged on the plane portion, and in said determining the state, degrees of an inclination and a direction of the terminal are determined.

(7) An electronic component evaluation device that evaluates a state of an electronic component based on imaging data obtained by image-capturing the electronic component including a component body, and a plurality of terminals attached to the component body, the device comprising:

a reference point information acquisition unit that acquires, with respect to at least one of the plurality of terminals, reference point information including at least one of position information and first height information of a plurality of reference points of the terminal; and a state determination unit that determines a state according to a shape of the electronic component based on a plurality of pieces of the reference point information.

(8) The electronic component evaluation device according to (7), wherein a plurality of the electronic components are image-captured in a sequentially continuous manner, and the state determination unit determines a state according to a shape of a first electronic component that is image-captured first, during at least part of a period of time between a completion of image capturing of the first electronic component and a start of image capturing of a second electronic component that is image-captured later.

(9) An electronic component evaluation program to be executed by an electronic component evaluation device that evaluates a state of an electronic component based on imaging data obtained by image-capturing the electronic component including a component body, and a plurality of terminals attached to the component body, the program causing a computer to execute a reference point information acquisition function of acquiring, with respect to at least one of the plurality of terminals, reference point information including at least one of position information and first height information of a plurality of reference points of the terminal, and a state determination function of determining a state according to a shape of the electronic component based on a plurality of pieces of the reference point information.

This application claims the benefits of Japanese Patent Application No. 2020-76717 filed on Apr. 23, 2020 in the Japanese Patent Office, the disclosure of which is herein incorporated in its entirety by reference.

What is claimed is:

1. An electronic component evaluation method for causing a processor to execute a process, the electronic component evaluation method comprising executing on the processor the steps of:

Image-capturing an electronic component including a component body and a plurality of terminals attached to the component body to obtain imaging data;

acquiring, with respect to at least one of the plurality of terminals, reference point information including at least one of position information and first height information of a plurality of reference points of the at least one of the plurality of terminals based on the imaging data; and determining a state according to a shape of the electronic component based on a plurality of pieces of the reference point information, wherein the determining of the state further includes:

creating a virtual plane based on the reference point information of at least three selected points of the plurality of reference points;

obtaining second height information based on other points of the plurality of reference points with respect to the virtual plane as a reference plane, the other points and the at least three selected points being different;

determining whether the virtual plane is a valid plane or an invalid plane based on the second height information; and detecting a flatness of the plurality of terminals based on the determined valid plane.

2. The electronic component evaluation method according to claim 1, wherein when the plurality of terminals have two terminals, the virtual plane passes through two selected points, among the plurality of reference points, on one of the two terminals, and when the plurality of terminals have four or more terminals, the virtual plane does not pass through a plurality of selected points, among the plurality of reference points, on one of the four or more terminals.

3. The electronic component evaluation method according to claim 1, wherein each of the plurality of terminals includes a bent portion that is bent along the component body and a plane portion that is along a mounting surface of the electronic component, the method further comprising:

prior to the acquiring of the reference point information, preliminarily capturing a three-dimensional image of an entire surface on a mounting surface side of the electronic component, and generating an entire image identifying at least a difference in height between the bent portion and the plane portion; and selecting, in the preliminary capturing and the generating, the plurality of reference points from an inner side of the plane portion with respect to a boundary between the bent portion and the plane portion.

4. The electronic component evaluation method according to claim 1, wherein with respect to the "m" terminals each having "n" reference points, a process of the acquiring of the reference point information of the different terminals in a preset order is repeated n cycles, and each of numbers indicating the order is associated with the corresponding acquired reference point information, and thereafter, a same group is created, and the same group includes the reference points with the respective numbers indicating the order, each of which is divided by "nn" to obtain the same remainder, and the reference point information corresponding to each of the numbers indicating the order having the remainder.

5. The electronic component evaluation method according to claim 1, wherein each of the plurality of terminals includes a plane portion that is along a mounting surface of the electronic component and the plurality of the reference points are arranged on the plane portion, and the virtual plane is created in consideration of degrees of an inclination and a direction of each of the plurality of terminals.

6. An electronic component evaluation device comprising:

an imaging sensor configured to perform image-capturing to obtain imaging data;

a memory configured to store a program; and a processor configured to execute the program so as to:

cause the image sensor to perform the image-capturing with respect to an electronic component including a component body and a plurality of terminals attached to the component body to obtain the imaging data;

acquire, with respect to at least one of the plurality of terminals, reference point information including at least one of position information and first height information of a plurality of reference points of the at least one of the plurality of terminals based on the imaging data; and determine a state according to a shape of the electronic component based on a plurality of pieces of the reference point information, wherein, in the determination of the state, the processor is further configured to:

create a virtual plane based on the reference point information of at least three selected points of the plurality of reference points;

obtain second height information based on other points of the plurality of reference points with respect to the virtual plane as a reference plane, the other points and the at least three selected points being different;

determine whether the virtual plane is a valid plane or an invalid plane based on the second height information; and detect a flatness of the plurality of terminals based on the determined valid plane.

7. The electronic component evaluation device according to claim 6, wherein a plurality of the electronic components are image-captured in a sequentially continuous manner, and the processor is configured to perform the detecting of the flatness based on a shape of a first electronic component that is image-captured first, during at least part of a period of time between a completion of image capturing of the first electronic component and a start of image capturing of a second electronic component that is image-captured later.

8. An electronic component evaluation program product embodying computer readable instructions stored on a non-transitory computer-readable medium for causing a computer to execute a process by a processor so as to perform the steps of:

Image-capturing an electronic component including a component body and a plurality of terminals attached to the component body to obtain imaging data;

acquiring, with respect to at least one of the plurality of terminals, reference point information including at least one of position information and first height information of a plurality of reference points of the at least one of the plurality of terminals based on the imaging data; and determining a state according to a shape of the electronic component based on a plurality of pieces of the reference point information, wherein the determining of the state further includes:
creating a virtual plane based on the reference point information of at least three selected points of the plurality of reference points;
obtaining second height information based on other points of the plurality of reference points with respect to the virtual plane as a reference plane, the other points and the at least three selected points being different;
determining whether the virtual plane is a valid plane or an invalid plane based on the second height information; and
detecting a flatness of the plurality of terminals based on the determined valid plane.

9. An electronic component evaluation method for causing a processor to execute a process, the electronic component evaluation method comprising executing on the processor the steps of:

Image-capturing an electronic component including a component body and a plurality of terminals attached tothe component body to obtain imaging data;

acquiring, with respect to at least one of the plurality of terminals, reference point information including at least one of position information and first height information of a plurality of reference points of the at least one of the plurality of terminals based on the imaging data; and determining a state according to a shape of the electronic component based on a plurality of pieces of the reference point information, wherein with respect to the "m" terminals each having "n" reference points, a process of the acquiring of the reference point information of the different terminals in a preset order is repeated n cycles, and each of numbers indicating the order is associated with the corresponding acquired reference point information, and thereafter, a same group is created, and the same group includes the reference points with the respective numbers indicating the order, each of which is divided by "m" to obtain the same remainder, and the reference point information corresponding to each of the numbers indicating the order having the remainder.

10. The electronic component evaluation device according to claim 6, wherein
when the plurality of terminals have twoterminals, the virtual plane passes through two selected points, among the plurality of reference points, on one of the two terminals, and
when the plurality of terminals have four or more terminals, the virtual plane does not pass through a plurality of selected points, among the plurality of reference points, on one of the four or more terminals.

11. The electronic component evaluation device according to claim 6, wherein
each of the plurality of terminals includes a bent portion that is bent along the component body and a plane portion that is along a mounting surface of the electronic component, the processor is further configured to:
prior to the acquiring of the reference point information, preliminarily capture a three-dimensional image of an entire surface on a mounting surface side of the electronic component, and generate an entire image identifying at least a difference in height between the bent portion and the plane portion; and
select the plurality of reference points from a n inner side of the plane portion with respect to a boundary between the bent portion and the plane portion.

12. The electronic component evaluation device according to claim 6, wherein
with respect to the "m" terminals each having "n" reference points, a process of the acquiring of the reference point information of the different terminals in a preset order is repeated n cycles, and each of numbers indicating the order is associated with the corresponding acquired reference point information, and
a same group is created, and the same group includes the reference points with the respective numbers indicating the order, each of which is divided by "m" to obtain the same remainder, and the reference point information corresponding to each of the numbers indicating the order having the remainder.

13. The electronic component evaluation device according to claim 6, wherein
each of the plurality of terminals includes a plane portion that is along a mounting surface of the electronic component and the plurality of the reference points are arranged on the plane portion, and
the virtual plane is created in consideration of degrees of an inclination and a direction of each of the plurality of terminals.

14. The electronic component evaluation program product according to claim 8, wherein
when the plurality of terminals have twoterminals, the virtual plane passes through two selected points, among the plurality of reference points, on one of the two terminals, and
when the plurality of terminals have four or more terminals, the virtual plane does not pass through a plurality of selected points, among the plurality of reference points, on one of the four or more terminals.

15. The electronic component evaluation program product according to claim 8, wherein
each of the plurality of terminals includes a bent portion that is bent along the component body and a plane portion that is along a mounting surface of the electronic component,
the processor is further configured to:
prior to the acquiring of the reference point information, preliminarily capture a three-dimensional image of an entire surface on a mounting surface side of the electronic component, and generate an entire image identifying at least a difference in height between the bent portion and the plane portion; and
select the plurality of reference points from an inner side of the plane portion with respect to a boundary between the bent portion and the plane portion.

16. The electronic component evaluation program product according to claim 8, wherein
with respect to the "m" terminals each having "n" reference points, a process of the acquiring of the reference point information of the different terminals in a preset order is repeated n cycles, and each of numbers indicating the order is associated with the corresponding acquired reference point information, and a same group is created, and the same group includes the reference points with the respective numbers indicating the order, each of which is divided by "m" to obtain the same remainder, and the reference point information corresponding to each of the numbers indicating the order having the remainder.

17. The electronic component evaluation program product according to claim 8, wherein
each of the plurality of terminals includes a plane portion that is along a mounting surface of the electronic component and the plurality of the reference points are arranged on the plane portion, and
the virtual plane is created in consideration of degrees of an inclination and a direction of each of the plurality of terminals.

18. The electronic component evaluation method according to claim 2, wherein
when the plurality of terminals have twoterminals, the virtual plane passes through two selected points, among the plurality of reference points, on one of the two terminals, and
when the plurality of terminals have four or more terminals, the virtual plane does not pass through a plurality of selected points, among the plurality of reference points, on one of the four or more terminals.

19. The electronic component evaluation method according to claim 9, wherein
each of the plurality of terminals includes a bent portion that is bent along the component body and a plane portion that is along a mounting surface of the electronic component,
the method further comprising:
prior to the acquiring of the reference point information, preliminarily capturing a three-dimensional image of an entire surface on a mounting surface side of the electronic component, and generating an entire image identifying at least a difference in height between the bent portion and the plane portion; and
selecting, in the preliminary capturing and the generating, the plurality of reference points from an inner side of the plane portion with respect to a boundary between the bent portion and the plane portion.

20. The electronic component evaluation method according to claim 9, wherein
each of the plurality of terminals includes a plane portion that is along a mounting surface of the electronic component and the plurality of the reference points are arranged on the plane portion, and the virtual plane is created in consideration of degrees of an inclination and a direction of each of the plurality of terminals.

* * * * *